United States Patent
Yagoub et al.

(10) Patent No.: US 12,189,614 B2
(45) Date of Patent: *Jan. 7, 2025

(54) SERIALIZATION OF DATA IN A CONCURRENT TRANSACTION PROCESSING DISTRIBUTED DATABASE

(71) Applicant: Snowflake Inc., Bozeman, MT (US)

(72) Inventors: Khaled Yagoub, Fremont, CA (US); Wumengjian Zhu, Cupertino, CA (US); Benoit Dageville, San Mateo, CA (US); William Waddington, Stateline, NV (US)

(73) Assignee: Snowflake Inc., Bozeman, MT (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/477,834

(22) Filed: Sep. 29, 2023

(65) Prior Publication Data
US 2024/0020298 A1 Jan. 18, 2024

Related U.S. Application Data

(63) Continuation of application No. 17/538,818, filed on Nov. 30, 2021, now Pat. No. 11,809,414.

(51) Int. Cl.
*G06F 16/00* (2019.01)
*G06F 11/14* (2006.01)
(Continued)

(52) U.S. Cl.
CPC ...... *G06F 16/2379* (2019.01); *G06F 11/1458* (2013.01); *G06F 16/221* (2019.01); *G06F 16/283* (2019.01)

(58) Field of Classification Search
CPC .. G06F 16/2237; G06F 16/283; G06F 16/221; G06F 16/2379; G06F 11/1458; G06F 11/1474
(Continued)

(56) References Cited

U.S. PATENT DOCUMENTS 9,459,319 B2 10/2016 Chen et al.
11,809,414 B2 * 11/2023 Yagoub ............... G06F 16/2237
(Continued)

OTHER PUBLICATIONS

"U.S. Appl. No. 17/538,818, Non Final Office Action mailed Feb. 2, 2023", 20 pgs.
(Continued)

*Primary Examiner* — Vincent F Boccio
(74) *Attorney, Agent, or Firm* — Schwegman Lundberg & Woessner, P.A.

(57) ABSTRACT

The subject technology serializes, by at least one hardware processor, non-primary key data of column-organized data into compressed serialized value data that is in a row-organized sequence, the compressed serialized value data compressed using at least one bitmap, the non-primary key data comprising a schema identifier, the column-organized data being stored in a columnar database system, the column-organized data comprising primary key data and the non-primary key data. The subject technology stores the compressed serialized value data in a key-value data store of a key-value database system, the key-value database system processing key-value data in a key-value format. The subject technology receives a query by the columnar database system. The subject technology deserializes a portion of the compressed serialized value data that corresponds to the query. The subject technology processes the query using the columnar database system.

20 Claims, 11 Drawing Sheets

(51) Int. Cl.
  *G06F 16/22* (2019.01)
  *G06F 16/23* (2019.01)
  *G06F 16/28* (2019.01)
(58) Field of Classification Search
  USPC ........................................................ 707/609
  See application file for complete search history.

(56) References Cited

U.S. PATENT DOCUMENTS

| | | |
|---|---|---|
| 2004/0111439 A1 | 6/2004 | Richardson et al. |
| 2010/0191777 A1 | 7/2010 | Ylonen |
| 2013/0185810 A1* | 7/2013 | Suchter ............... G06F 21/6209 |
| | | 726/29 |
| 2015/0213552 A1 | 7/2015 | Silvano |
| 2017/0147664 A1 | 5/2017 | Bussler et al. |
| 2023/0169068 A1 | 6/2023 | Yagoub et al. |

OTHER PUBLICATIONS

"U.S. Appl. No. 17/538,818, Notice of Allowance mailed Aug. 3, 2023", 8 pgs.
"U.S. Appl. No. 17/538,818, Preliminary Amendment filed Dec. 8, 2021".
"U.S. Appl. No. 17/538,818, Response filed May 2, 2023 to Non Final Office Action mailed Feb. 2, 2023", 10 pgs.

\* cited by examiner

SERIALIZATION OF DATA IN A CONCURRENT TRANSACTION PROCESSING DISTRIBUTED DATABASE

CROSS-REFERENCE TO RELATED APPLICATIONS

This application is a Continuation of U.S. patent application Ser. No. 17/538,818, filed Nov. 30, 2021, entitled "SERIALIZATION OF DATA IN A CONCURRENT TRANSACTION PROCESSING DISTRIBUTED DATABASE", the contents of which are incorporated herein by reference in its entirety for all purposes.

TECHNICAL FIELD

Embodiments of the disclosure relate generally to a network-based database system or a cloud data platform and, more specifically, to processing concurrent transactions to enable transactional processing and compaction of the transactional data in a scalable and performant manner within the database system.

BACKGROUND

Cloud-based data warehouses and other database systems and platforms sometimes provide support for transactional processing that enable such systems to perform operations that are not available through the built-in, system-defined functions. However, transactional processing of the data can rapidly grow, and it can be difficult to process data in different formats.

BRIEF DESCRIPTION OF THE DRAWINGS

The present disclosure will be understood more fully from the detailed description given below and from the accompanying drawings of various embodiments of the disclosure.

DETAILED DESCRIPTION

Figure 1:
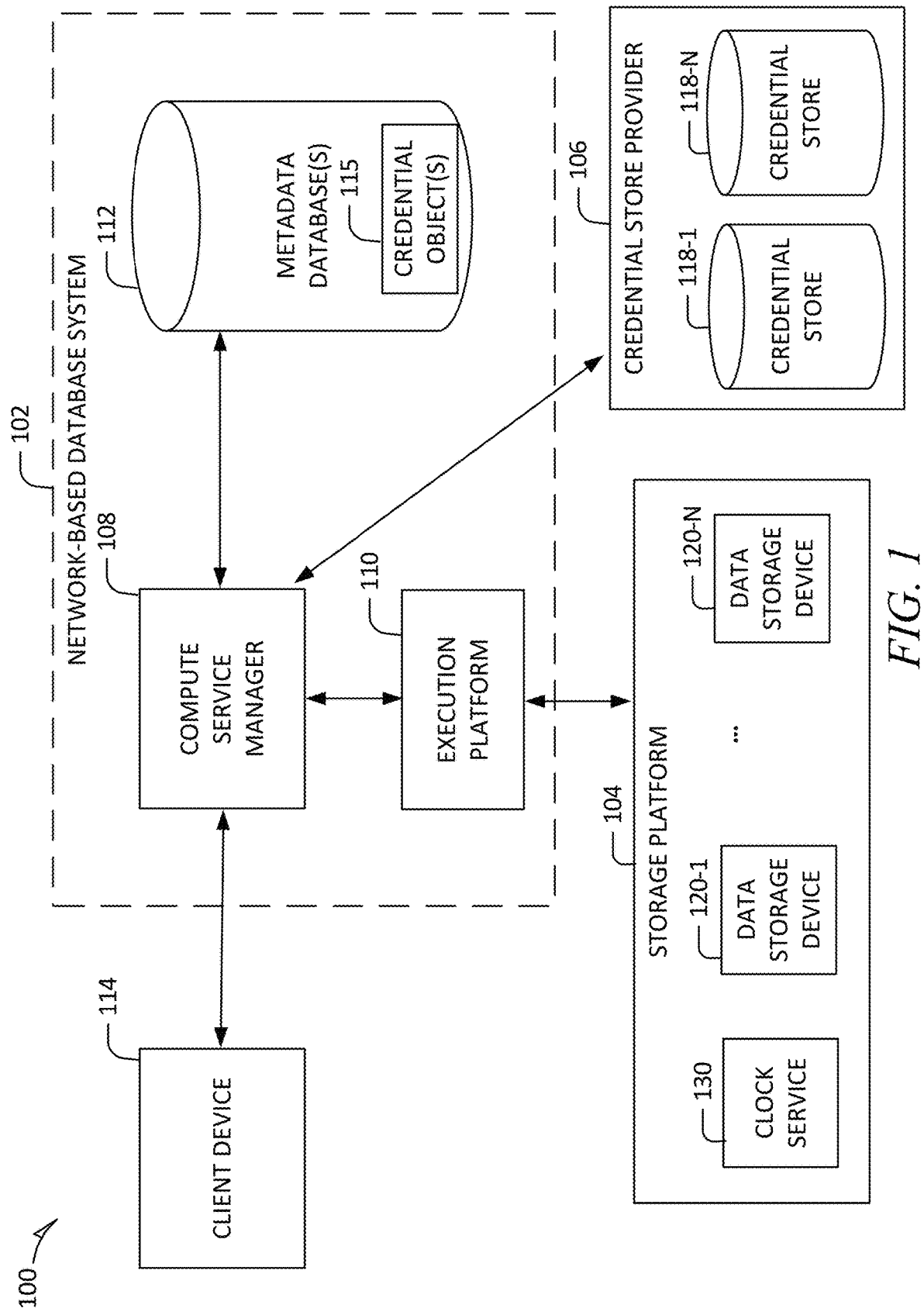
FIG. 1 illustrates an example computing environment that includes a network-based database system in communication with a cloud storage platform, in accordance with some embodiments of the present disclosure.

Reference will now be made in detail to specific example embodiments for carrying out the inventive subject matter. Examples of these specific embodiments are illustrated in the accompanying drawings, and specific details are set forth in the following description in order to provide a thorough understanding of the subject matter. It will be understood that these examples are not intended to limit the scope of the claims to the illustrated embodiments. On the contrary, they are intended to cover such alternatives, modifications, and equivalents as may be included within the scope of the disclosure.

In database systems, performing transactions on a given database can be supported. To facilitate that a given transaction is committed to a table, database systems can employ varying approaches including Online Transactional Processing (OLTP) techniques. As discussed herein, OLTP refers to a category of data processing that involves transaction-oriented tasks. In an example, OLTP involves inserting, updating, and/or deleting varying amounts of data in a given database. OLTP can deal with large numbers of transactions by a large number of users. Increasingly, such transactions are implemented by users that are working in a distributed and networked environment from varying locations and computing environments. Thus, it is also increasingly important to ensure such transactions execute and complete in a concurrent manner that protects the integrity and consistency of the data in such a distributed environment.

As described herein, a database system provides concurrency control and isolation for executing a series of query statements (e.g., Structured Query Language (SQL) statements) within a transaction against a linearizable storage. In particular, the database system herein employs a concurrency control mechanism that is a combination of a multi-version concurrency control for read operations (MVCC) and locking for write operations. Additionally, the database system implements a targeted isolation level (e.g., snapshot isolation), where each statement can execute against a different snapshot of a database, and write locks are held until a transaction commit.

The database system, in an embodiment, implements a two-level transaction hierarchy, where a top-level transaction corresponds to a SQL transaction, and a nested transaction corresponds to a SQL statement within the parent SQL transaction. A given nested transaction can perform read and write operations, and can perform a rollback and restart execution zero or more times before succeeding. Upon transaction commit, write operations can become visible, and write locks held by each contained statement can be released.

In some example embodiments, a hybrid database architecture implements an OLTP database system that functions in concert with an online analytical processing (OLAP) database system. The OLTP database system can be implemented to store transactional data, and the transactional data and additional non-transactional data (e.g., user data) can be processed via the OLAP system to perform complex queries. The OLAP database is a data structure or data warehouse configured for a relatively small number of complex transactions. OLAP queries are often complex and involve aggregations. For OLAP database system, the emphasis can be the response time as an effectiveness measure for completing the complex queries. The OLAP database system can be configured as a multidimensional database that has one or more hierarchies or formula-based relationships of data within each dimension. Aggregation or consolidation of data in the OLAP database system involves computing all of these data relationships for one or more dimensions, for example, adding up all subsets (e.g., Employee Department Data) to get total for the complete set (e.g., Total Employee Department data).

In some example embodiments, the OLTP database system processes data in a row-organized byte sequences (e.g., key-value (KV) pairs) for use in a key-value store, and the OLAP database system processes the data in a columnar format for use in a micro-partition based datastore. The hybrid database system can implement a serializer system to convert columnar data to row data to transmit the data between the database systems for processing.

Generally, a columnar database is a database management system that stores data in columns instead of rows. Columnar data format is particularly beneficial for data analytics and data warehousing. Column-oriented databases and row-oriented databases are both methods for processing data in database systems. While column-oriented databases store data in columns, row-oriented databases store data in rows. In particular, for example, instead of keeping a record of every column in a table in a single row, a column-oriented database will store the data for each column together in a single column. OLTP applications are also not suitable in column-oriented databases. Row-oriented databases have higher performance in OLTP applications due to their higher concurrent processing and isolation capabilities, and they use disk space more efficiently. As discussed, an OLTP database system is a type of database management system that handles large amounts of data and short-term queries. Data is stored until it is modified or deleted, and the OLTP system will typically remain operational during this storage period. In contrast, the OLAP system data is aggregated and analyzed to provide a strategic business view. The data storage needs of OLTP and OLAP are different. OLTP primarily stores insert, update and delete operations, while OLAP primarily stores aggregated data. In some example embodiments, the data to be converted comprises a key and value data (e.g., KV pairs), where a given key references a corresponding set of value data.

In some example embodiments, in the OLTP database the database management system can store the KV value data as byte strings, in which the keys are stored and retrieved in the key-value store (e.g., Foundation DB), but the value byte strings need not be otherwise interpreted or analyzed by the OLTP database. In some example embodiments, due to the OLTP database storing data using keys and values as byte strings, applications storing data in the OLTP database serialize other data types (e.g., columnar data, integers, floats, arrays) before storing them in the OLTP database.

In some example embodiments, the hybrid database system implements a plurality of execution nodes that receive the data for processing in the columnar format. The execution nodes can implement the serialization system to serialize the key part and further serialize the value part of each KV pair to be converted. In some example embodiments, to convert the key portion data of the KV pairs, the serialization system implements a tupler layer for serialization of the keys to: (1) preserve the sort order and (2) sort the key data into ranges.

In some example embodiments, to serialize the value part of the keys, the serialization system splits the value data into pieces (e.g., 70 bytes, 100 bytes) and compresses the value data. In some example embodiments, the value data is not split into pieces and instead compressed and serialized and the splitting of the data is implemented in the OLTP database system (e.g., by the transaction manager system). In some example embodiments, the value data is compressed using an auxiliary compression application (e.g., the Snappy compression and decompression library, Zip compression) and compressed using bitmaps.

In some example embodiments, a bitmap is a contiguous piece of memory that is stored as a binary data type. A bitmap is an array of bits that can be set individually. For example, a 4-byte bitmap consists of 32 bits (4 bytes*8 bits per byte). In some example embodiments, for each possible distinct value, a bit in the bitmap can represent the presence or absence of the distinct value in the data. For example, if the values 3 and 5 are present in the data, the 3rd and 5th bits are set to 1 in the bitmap. In this way, bitmap provides a significant space advantage via compression over other structures for query of such data (e.g., columns). In some example embodiments, if the distinct values are not numeric values, those values must map the values to numeric values.

In some example embodiments, the bitmap compression compresses by configuration or design using bit mappings in the serialization, whereas the compression application can receive any data for compression and apply compression to the input data. In some example embodiments, the value data is compressed using bitmaps and then further compressed using the compression application, where the additional auxiliary compression (e.g., Snappy compression) is indicated in the row data using a bit.

In some example embodiments, once the data is serialized into row data, a given query may be processed that requires only a portion of the serialized data (e.g., a given query can complete its processing using a few columns of the data). To avoid unpacking all of the serialized data, in some example embodiments, only a subset of columns that are involved in the query processing are deserialized. The process of identifying the subset of columns and deserializing them may incur heightened computation costs (e.g., increased CPU usage), however the cost is significantly less and is faster than unpacking the entire set of serialized value data.

FIG. 1 illustrates an example computing environment 100 that includes a database system in the example form of a network-based database system 102, in accordance with some embodiments of the present disclosure. To avoid obscuring the inventive subject matter with unnecessary detail, various functional components that are not germane to conveying an understanding of the inventive subject matter have been omitted from FIG. 1. However, a skilled artisan will readily recognize that various additional functional components may be included as part of the computing environment 100 to facilitate additional functionality that is not specifically described herein. In other embodiments, the computing environment may comprise another type of network-based database system or a cloud data platform.

As shown, the computing environment 100 comprises the network-based database system 102 in communication with a cloud storage platform 104 (e.g., AWS®, Microsoft Azure Blob Storage®, or Google Cloud Storage), and a cloud credential store provider 106. The network-based database system 102 is a network-based system used for reporting and analysis of integrated data from one or more disparate sources including one or more storage locations within the cloud storage platform 104. The cloud storage platform 104 comprises a plurality of computing machines and provides on-demand computer system resources such as data storage and computing power to the network-based database system 102.

The network-based database system 102 comprises a compute service manager 108, an execution platform 110, and one or more metadata databases 112. The network-based database system 102 hosts and provides data reporting and analysis services to multiple client accounts.

The compute service manager 108 coordinates and manages operations of the network-based database system 102. The compute service manager 108 also performs query optimization and compilation as well as managing clusters of computing services that provide compute resources (also referred to as "virtual warehouses"). The compute service manager 108 can support any number of client accounts such as end users providing data storage and retrieval requests, system administrators managing the systems and methods described herein, and other components/devices that interact with compute service manager 108.

The compute service manager 108 is also in communication with a client device 114. The client device 114 corresponds to a user of one of the multiple client accounts supported by the network-based database system 102. A user may utilize the client device 114 to submit data storage, retrieval, and analysis requests to the compute service manager 108.

The compute service manager 108 is also coupled to one or more metadata databases 112 that store metadata pertaining to various functions and aspects associated with the network-based database system 102 and its users. For example, a metadata database 112 may include a summary of data stored in remote data storage systems as well as data available from a local cache. Additionally, a metadata database 112 may include information regarding how data is organized in remote data storage systems (e.g., the cloud storage platform 104) and the local caches. Information stored by a metadata database 112 allows systems and services to determine whether a piece of data needs to be accessed without loading or accessing the actual data from a storage device.

As another example, a metadata database 112 can store one or more credential objects 115. In general, a credential object 115 indicates one or more security credentials to be retrieved from a remote credential store. For example, the credential store provider 106 maintains multiple remote credential stores 118-1 to 118-N. Each of the remote credential stores 118-1 to 118-N may be associated with a user account and may be used to store security credentials associated with the user account. A credential object 115 can indicate one of more security credentials to be retrieved by the compute service manager 108 from one of the remote credential stores 118-1 to 118-N (e.g., for use in accessing data stored by the storage platform 104).

The compute service manager 108 is further coupled to the execution platform 110, which provides multiple computing resources that execute various data storage and data retrieval tasks. The execution platform 110 is coupled to storage platform 104 of the cloud storage platform 104. The storage platform 104 comprises multiple data storage devices 120-1 to 120-N. In some embodiments, the data storage devices 120-1 to 120-N are cloud-based storage devices located in one or more geographic locations. For example, the data storage devices 120-1 to 120-N may be part of a public cloud infrastructure or a private cloud infrastructure. The data storage devices 120-1 to 120-N may be hard disk drives (HDDs), solid state drives (SSDs), storage clusters, Amazon S3™ storage systems, or any other data storage technology. Additionally, the cloud storage platform 104 may include distributed file systems (such as Hadoop Distributed File Systems (HDFS)), object storage systems, and the like.

As further shown, the storage platform 104 includes clock service 130 which can be contacted to fetch a number that will be greater than any number previously returned, such as one that correlates to the current time. Clock service 130 is discussed further herein below with respect to embodiments of the subject system.

The execution platform 110 comprises a plurality of compute nodes. A set of processes on a compute node executes a query plan compiled by the compute service manager 108. The set of processes can include: a first process to execute the query plan; a second process to monitor and delete cache files using a least recently used (LRU) policy and implement an out of memory (OOM) error mitigation process; a third process that extracts health information from process logs and status to send back to the compute service manager 108; a fourth process to establish communication with the compute service manager 108 after a system boot; and a fifth process to handle all communication with a compute cluster for a given job provided by the compute service manager 108 and to communicate information back to the compute service manager 108 and other compute nodes of the execution platform 110.

In some embodiments, communication links between elements of the computing environment 100 are implemented via one or more data communication networks. These data communication networks may utilize any communication protocol and any type of communication medium. In some embodiments, the data communication networks are a combination of two or more data communication networks (or sub-Networks) coupled to one another. In alternative embodiments, these communication links are implemented using any type of communication medium and any communication protocol.

The compute service manager 108, metadata database(s) 112, execution platform 110, and storage platform 104, are shown in FIG. 1 as individual discrete components. However, each of the compute service manager 108, metadata database(s) 112, execution platform 110, and storage platform 104 may be implemented as a distributed system (e.g., distributed across multiple systems/platforms at multiple geographic locations). Additionally, each of the compute service manager 108, metadata database(s) 112, execution platform 110, and storage platform 104 can be scaled up or down (independently of one another) depending on changes to the requests received and the changing needs of the network-based database system 102. Thus, in the described embodiments, the network-based database system 102 is dynamic and supports regular changes to meet the current data processing needs.

During typical operation, the network-based database system 102 processes multiple jobs determined by the compute service manager 108. These jobs are scheduled and managed by the compute service manager 108 to determine when and how to execute the job. For example, the compute service manager 108 may divide the job into multiple discrete tasks (or transactions as discussed further herein) and may determine what data is needed to execute each of the multiple discrete tasks. The compute service manager 108 may assign each of the multiple discrete tasks to one or more nodes of the execution platform 110 to process the task. The compute service manager 108 may determine what data is needed to process a task and further determine which nodes within the execution platform 110 are best suited to process the task. Some nodes may have already cached the data needed to process the task and, therefore, be a good candidate for processing the task. Metadata stored in a metadata database 112 assists the compute service manager 108 in determining which nodes in the execution platform 110 have already cached at least a portion of the data needed to process the task. One or more nodes in the execution platform 110 process the task using data cached by the nodes and, if necessary, data retrieved from the cloud storage platform 104. It is desirable to retrieve as much data as possible from caches within the execution platform 110 because the retrieval speed is typically much faster than retrieving data from the cloud storage platform 104.

As shown in FIG. 1, the computing environment 100 separates the execution platform 110 from the storage platform 104. In this arrangement, the processing resources and cache resources in the execution platform 110 operate independently of the data storage devices 120-1 to 120-N in the cloud storage platform 104. Thus, the computing resources and cache resources are not restricted to specific data storage devices 120-1 to 120-N. Instead, all computing resources and all cache resources may retrieve data from, and store data to, any of the data storage resources in the cloud storage platform 104.

Figure 2:
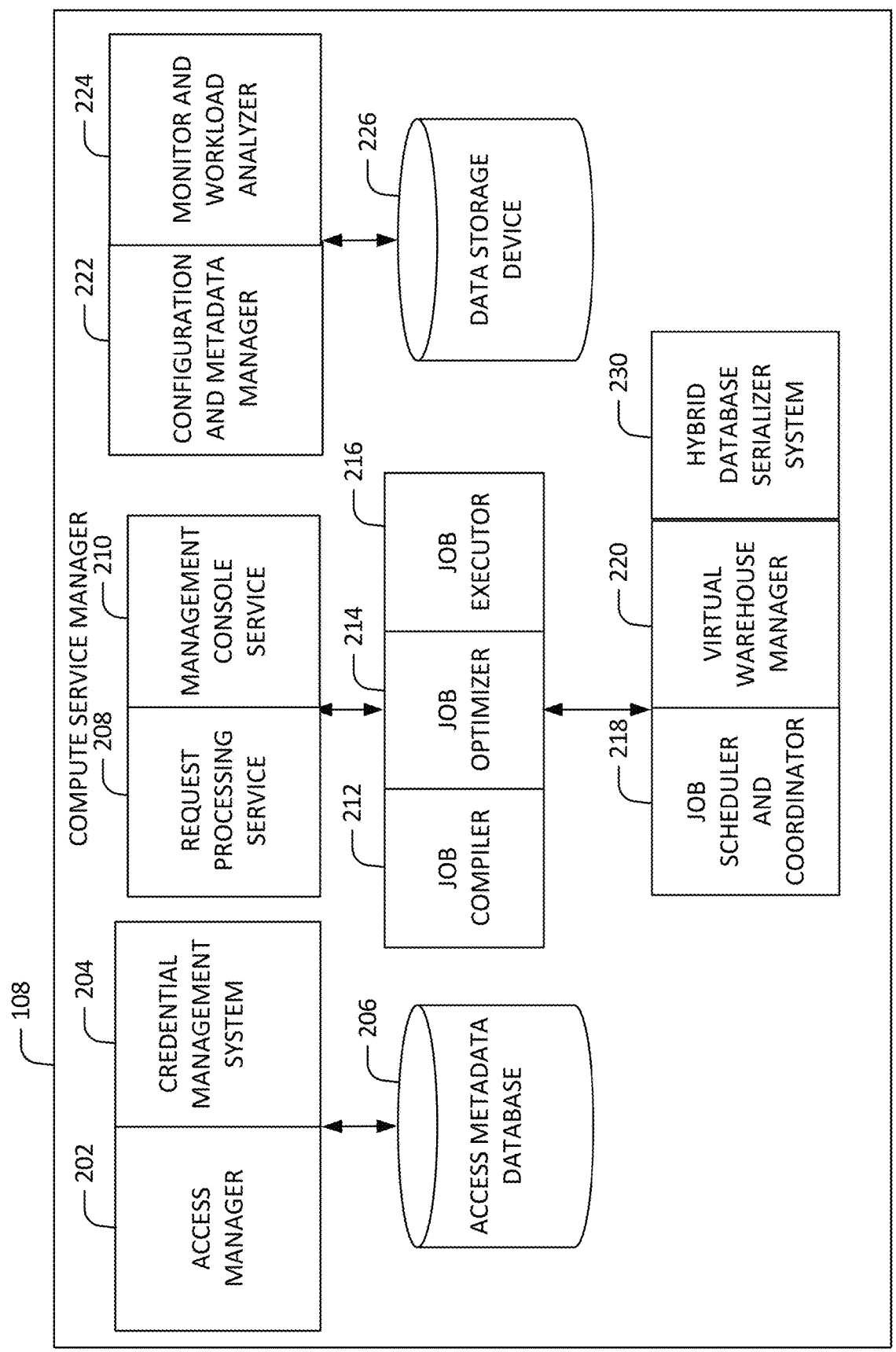
FIG. 2 is a block diagram illustrating components of a compute service manager, in accordance with some embodiments of the present disclosure.

FIG. 2 is a block diagram illustrating components of the compute service manager 108, in accordance with some embodiments of the present disclosure. As shown in FIG. 2, the compute service manager 108 includes an access manager 202 and a credential management system 204 coupled to an access metadata database 206, which is an example of the metadata database(s) 112. Access manager 202 handles authentication and authorization tasks for the systems described herein. The credential management system 204 facilitates use of remote stored credentials (e.g., credentials stored in one of the remote credential stores 118-1 to 118-N) to access external resources such as data resources in a remote storage device. As used herein, the remote storage devices may also be referred to as "persistent storage devices" or "shared storage devices." For example, the credential management system 204 may create and maintain remote credential store definitions and credential objects (e.g., in the access metadata database 206). A remote credential store definition identifies a remote credential store (e.g., one or more of the remote credential stores 118-1 to 118-N) and includes access information to access security credentials from the remote credential store. A credential object identifies one or more security credentials using non-sensitive information (e.g., text strings) that are to be retrieved from a remote credential store for use in accessing an external resource. When a request invoking an external resource is received at run time, the credential management system 204 and access manager 202 use information stored in the access metadata database 206 (e.g., a credential object and a credential store definition) to retrieve security credentials used to access the external resource from a remote credential store.

A request processing service 208 manages received data storage requests and data retrieval requests (e.g., jobs to be performed on database data). For example, the request processing service 208 may determine the data to process a received query (e.g., a data storage request or data retrieval request). The data may be stored in a cache within the execution platform 110 or in a data storage device in storage platform 104.

A management console service 210 supports access to various systems and processes by administrators and other system managers. Additionally, the management console service 210 may receive a request to execute a job and monitor the workload on the system.

The compute service manager 108 also includes a job compiler 212, a job optimizer 214 and a job executor 216. The job compiler 212 parses a job into multiple discrete tasks and generates the execution code for each of the multiple discrete tasks. The job optimizer 214 determines the best method to execute the multiple discrete tasks based on the data that needs to be processed. The job optimizer 214 also handles various data pruning operations and other data optimization techniques to improve the speed and efficiency of executing the job. The job executor 216 executes the execution code for jobs received from a queue or determined by the compute service manager 108.

A job scheduler and coordinator 218 sends received jobs to the appropriate services or systems for compilation, optimization, and dispatch to the execution platform 110. For example, jobs may be prioritized and then processed in that prioritized order. In an embodiment, the job scheduler and coordinator 218 determines a priority for internal jobs that are scheduled by the compute service manager 108 with other "outside" jobs such as user queries that may be scheduled by other systems in the database (e.g., the storage platform 104) but may utilize the same processing resources in the execution platform 110. In some embodiments, the job scheduler and coordinator 218 identifies or assigns particular nodes in the execution platform 110 to process particular tasks. A virtual warehouse manager 220 manages the operation of multiple virtual warehouses implemented in the execution platform 110. For example, the virtual warehouse manager 220 may generate query plans for executing received queries. The hybrid database serializer system 230 manages converting data between an OLAP data format and an OLTP data store in the network-based database system 102. Further details of the hybrid database system implementing OLAP (aggregate) and OLTP (transactional) database systems is discussed in application Ser. No. 17/249,598, titled "Aggregate and Transactional Networked Database Query Processing," filed on Mar. 5, 2021, which is hereby incorporated by reference in its entirety.

The compute service manager 108 further includes a configuration and metadata manager 222, which manages the information related to the data stored in the remote data storage devices and in the local buffers (e.g., the buffers in execution platform 110). The configuration and metadata manager 222 uses metadata to determine which data files need to be accessed to retrieve data for processing a particular task or job. A monitor and workload analyzer 224 oversee processes performed by the compute service manager 108 and manages the distribution of tasks (e.g., workload) across the virtual warehouses and execution nodes in the execution platform 110. The monitor and workload analyzer 224 also redistributes tasks, as needed, based on changing workloads throughout the network-based database system 102 and may further redistribute tasks based on a user (e.g., "external") query workload that may also be processed by the execution platform 110. The configuration and metadata manager 222 and the monitor and workload analyzer 224 are coupled to a data storage device 226. Data storage device 226 in FIG. 2 represents any data storage device within the network-based database system 102. For example, data storage device 226 may represent buffers in execution platform 110, storage devices in storage platform 104, or any other storage device.

As described in embodiments herein, the compute service manager 108 validates all communication from an execution platform (e.g., the execution platform 110) to validate that the content and context of that communication are consistent with the task(s) known to be assigned to the execution platform. For example, an instance of the execution platform executing a query A should not be allowed to request access to data-source D (e.g., data storage device 226) that is not relevant to query A. Similarly, a given execution node (e.g., execution node 302-1 may need to communicate with another execution node (e.g., execution node 302-2), and should be disallowed from communicating with a third execution node (e.g., execution node 312-1) and any such illicit communication can be recorded (e.g., in a log or other location). Also, the information stored on a given execution node is restricted to data relevant to the current query and any other data is unusable, rendered so by destruction or encryption where the key is unavailable.

Figure 3:
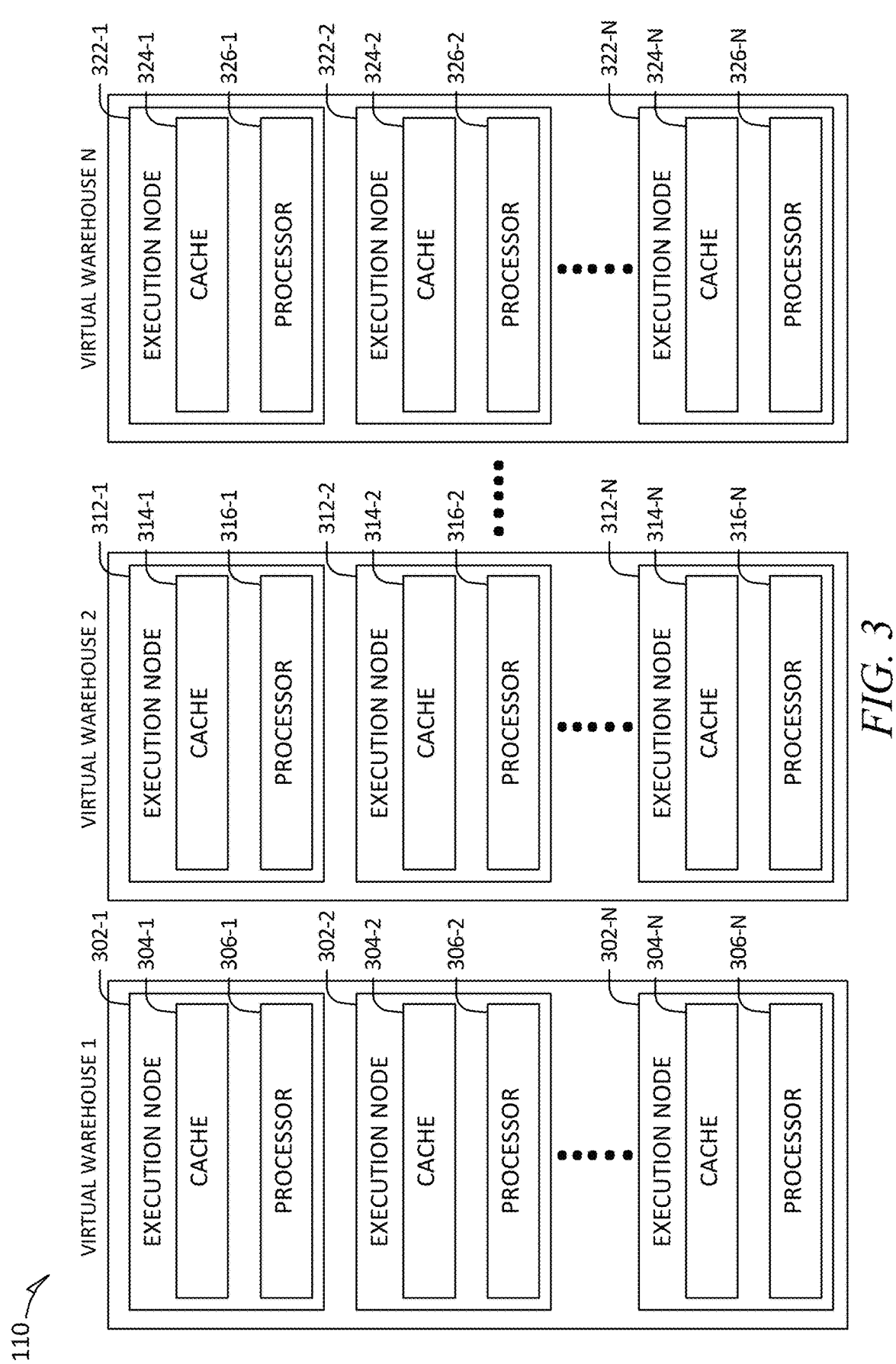
FIG. 3 is a block diagram illustrating components of an execution platform, in accordance with some embodiments of the present disclosure.

FIG. 3 is a block diagram illustrating components of the execution platform 110, in accordance with some embodiments of the present disclosure. As shown in FIG. 3, the execution platform 110 includes multiple virtual warehouses, including virtual warehouse 1, virtual warehouse 2, and virtual warehouse n. Each virtual warehouse includes multiple execution nodes that each include a data cache and a processor. The virtual warehouses can execute multiple tasks in parallel by using the multiple execution nodes. As discussed herein, the execution platform 110 can add new virtual warehouses and drop existing virtual warehouses in real-time based on the current processing needs of the systems and users. This flexibility allows the execution platform 110 to quickly deploy large amounts of computing resources when needed without being forced to continue paying for those computing resources when they are no longer needed. All virtual warehouses can access data from any data storage device (e.g., any storage device in cloud storage platform 104).

Although each virtual warehouse shown in FIG. 3 includes three execution nodes, a particular virtual warehouse may include any number of execution nodes. Further, the number of execution nodes in a virtual warehouse is dynamic, such that new execution nodes are created when additional demand is present, and existing execution nodes are deleted when they are no longer necessary.

Each virtual warehouse is capable of accessing any of the data storage devices 120-1 to 120-N shown in FIG. 1. Thus, the virtual warehouses are not necessarily assigned to a specific data storage device 120-1 to 120-N and, instead, can access data from any of the data storage devices 120-1 to 120-N within the cloud storage platform 104. Similarly, each of the execution nodes shown in FIG. 3 can access data from any of the data storage devices 120-1 to 120-N. In some embodiments, a particular virtual warehouse or a particular execution node may be temporarily assigned to a specific data storage device, but the virtual warehouse or execution node may later access data from any other data storage device.

In the example of FIG. 3, virtual warehouse 1 includes three execution nodes 302-1, 302-2, and 302-N. Execution node 302-1 includes a cache 304-1 and a processor 306-1. Execution node 302-2 includes a cache 304-2 and a processor 306-2. Execution node 302-N includes a cache 304-N and a processor 306-N. Each execution node 302-1, 302-2, and 302-N is associated with processing one or more data storage and/or data retrieval tasks. For example, a virtual warehouse may handle data storage and data retrieval tasks associated with an internal service, such as a clustering service, a materialized view refresh service, a file compaction service, a storage procedure service, or a file upgrade service. In other implementations, a particular virtual warehouse may handle data storage and data retrieval tasks associated with a particular data storage system or a particular category of data.

Similar to virtual warehouse 1 discussed above, virtual warehouse 2 includes three execution nodes 312-1, 312-2, and 312-N. Execution node 312-1 includes a cache 314-1 and a processor 316-1. Execution node 312-2 includes a cache 314-2 and a processor 316-2. Execution node 312-N includes a cache 314-N and a processor 316-N. Additionally, virtual warehouse 3 includes three execution nodes 322-1, 322-2, and 322-N. Execution node 322-1 includes a cache 324-1 and a processor 326-1. Execution node 322-2 includes a cache 324-2 and a processor 326-2. Execution node 322-N includes a cache 324-N and a processor 326-N.

In some embodiments, the execution nodes shown in FIG. 3 are stateless with respect to the data being cached by the execution nodes. For example, these execution nodes do not store or otherwise maintain state information about the execution node or the data being cached by a particular execution node. Thus, in the event of an execution node failure, the failed node can be transparently replaced by another node. Since there is no state information associated with the failed execution node, the new (replacement) execution node can easily replace the failed node without concern for recreating a particular state.

Although the execution nodes shown in FIG. 3 each includes one data cache and one processor, alternative embodiments may include execution nodes containing any number of processors and any number of caches. Additionally, the caches may vary in size among the different execution nodes. The caches shown in FIG. 3 store, in the local execution node, data that was retrieved from one or more data storage devices in cloud storage platform 104. Thus, the caches reduce or eliminate the bottleneck problems occurring in platforms that consistently retrieve data from remote storage systems. Instead of repeatedly accessing data from the remote storage devices, the systems and methods described herein access data from the caches in the execution nodes, which is significantly faster and avoids the bottleneck problem discussed above. In some embodiments, the caches are implemented using high-speed memory devices that provide fast access to the cached data. Each cache can store data from any of the storage devices in the cloud storage platform 104.

Further, the cache resources and computing resources may vary between different execution nodes. For example, one execution node may contain significant computing resources and minimal cache resources, making the execution node useful for tasks that require significant computing resources. Another execution node may contain significant cache resources and minimal computing resources, making this execution node useful for tasks that require caching of large amounts of data. Yet another execution node may contain cache resources providing faster input-output operations, useful for tasks that require fast scanning of large amounts of data. In some embodiments, the cache resources and computing resources associated with a particular execution node are determined when the execution node is created, based on the expected tasks to be performed by the execution node.

Additionally, the cache resources and computing resources associated with a particular execution node may change over time based on changing tasks performed by the execution node. For example, an execution node may be assigned more processing resources if the tasks performed by the execution node become more processor-intensive. Similarly, an execution node may be assigned more cache resources if the tasks performed by the execution node require a larger cache capacity.

Although virtual warehouses 1, 2, and n are associated with the same execution platform 110, the virtual warehouses may be implemented using multiple computing systems at multiple geographic locations. For example, virtual warehouse 1 can be implemented by a computing system at a first geographic location, while virtual warehouses 2 and n are implemented by another computing system at a second geographic location. In some embodiments, these different computing systems are cloud-based computing systems maintained by one or more different entities.

Additionally, each virtual warehouse is shown in FIG. 3 as having multiple execution nodes. The multiple execution nodes associated with each virtual warehouse may be implemented using multiple computing systems at multiple geographic locations. For example, an instance of virtual warehouse 1 implements execution nodes 302-1 and 302-2 on one computing platform at a geographic location and implements execution node 302-N at a different computing platform at another geographic location. Selecting particular computing systems to implement an execution node may depend on various factors, such as the level of resources needed for a particular execution node (e.g., processing resource requirements and cache requirements), the resources available at particular computing systems, communication capabilities of networks within a geographic location or between geographic locations, and which computing systems are already implementing other execution nodes in the virtual warehouse.

Execution platform 110 is also fault tolerant. For example, if one virtual warehouse fails, that virtual warehouse is quickly replaced with a different virtual warehouse at a different geographic location.

A particular execution platform 110 may include any number of virtual warehouses. Additionally, the number of virtual warehouses in a particular execution platform is dynamic, such that new virtual warehouses are created when additional processing and/or caching resources are needed. Similarly, existing virtual warehouses may be deleted when the resources associated with the virtual warehouse are no longer necessary.

In some embodiments, the virtual warehouses may operate on the same data in cloud storage platform 104, but each virtual warehouse has its own execution nodes with independent processing and caching resources. This configuration allows requests on different virtual warehouses to be processed independently and with no interference between the requests. This independent processing, combined with the ability to dynamically add and remove virtual warehouses, supports the addition of new processing capacity for new users without impacting the performance observed by the existing users.

Figure 4:
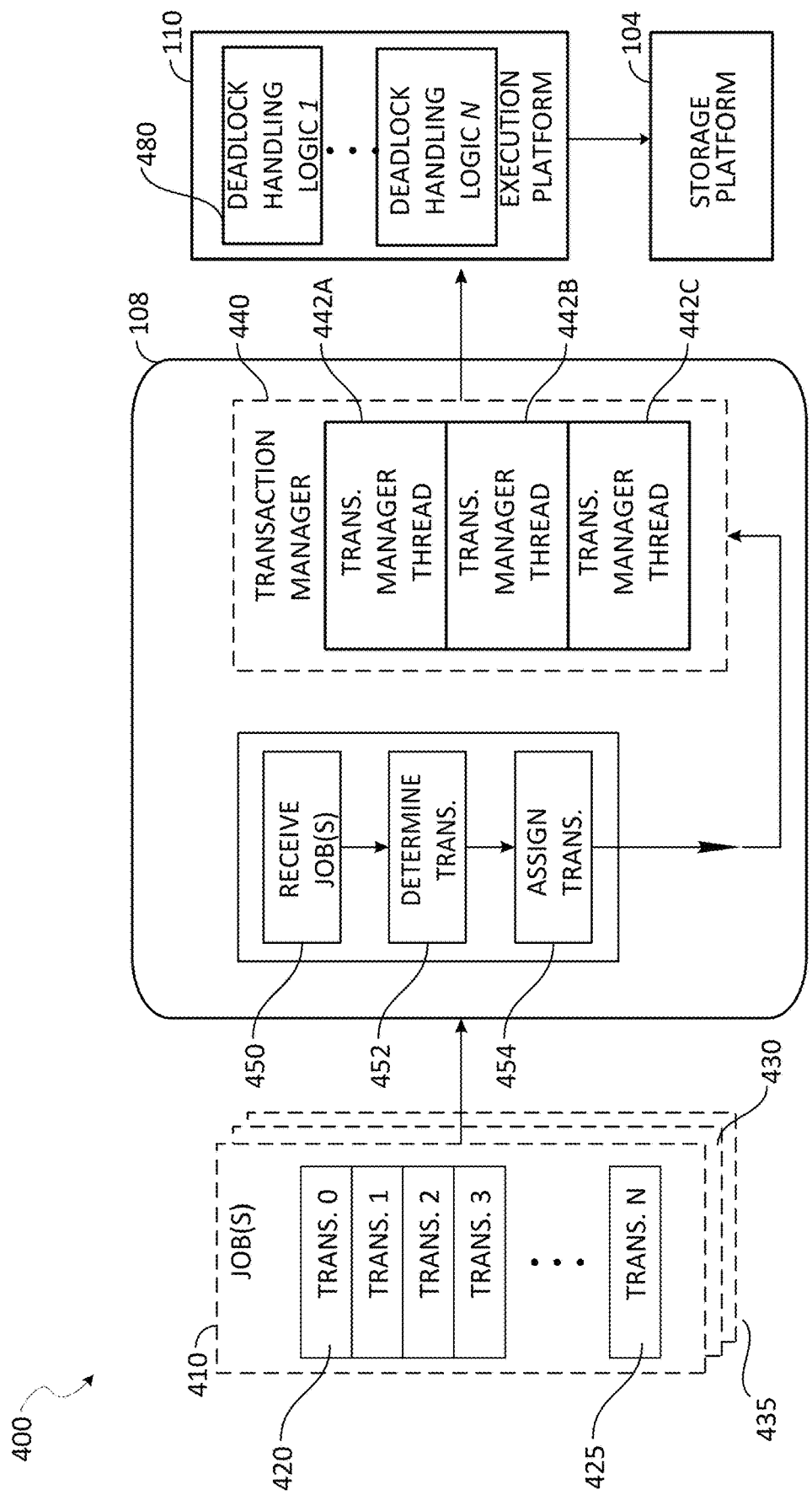
FIG. 4 is a computing environment conceptually illustrating an example software architecture for managing and executing concurrent transactions on a database system, which can be performed by a given execution node of the execution platform, in accordance with some embodiments of the present disclosure.

FIG. 4 is a computing environment 400 conceptually illustrating an example software architecture for managing and executing concurrent transactions on a database system (e.g., the network-based database system 102), which can be performed by a given execution node of the execution platform 110, in accordance with some embodiments of the present disclosure. In an embodiment, a process flow is performed by a transaction manager that is configured to manage and execute transactions as described further herein.

As shown, the transaction manager 440 is included in the compute service manager 108. The transaction manager 440 receives a job 410 that may be divided into one or more discrete transactions 420-425, e.g., transaction 0, transaction 1, transaction 2, transaction 3, and so forth through transaction (n). In an embodiment, each transaction includes one or more tasks or operations (e.g., read operation, write operation, database statement, user defined function, and the like) to perform. The transaction manager 440 receives the job at 450 and determines transactions at 452 that may be carried out to execute the job 410. The transaction manager 440 is configured to determine the one or more discrete transactions, such as transaction 0, transaction 1, transaction 2, transaction 3, and so forth, based on applicable rules and/or parameters. The transaction manager 440 assigns transactions at 454.

As further shown, the transaction manager 440 is configured to concurrently process multiple jobs that can be performed by the execution platform 110. In an example, the transaction manager 440 can receive a second job 430 or a third job 435, each of which include respective discrete transactions that are to be performed on the execution platform 110. Each of the transactions may be executed concurrently by the execution platform 110 in which different operations are performed (e.g., a respective read operation or write operation are executed from each of the transactions by the execution platform 110).

In an implementation, the job 410, including the respective transactions therein, is carried out by the transaction manager 440 which can perform the responsibilities of a query manager (e.g., processing query statements and operations, and the like). As shown, the transaction manager 440 may have multiple threads, including, for example, transaction manager threads 442A, 442B, 442C, and so forth. The transaction manager 440 may assign the job 410, including the multiple discrete transactions, to a particular virtual warehouse of the execution platform 110. Based on this assignment, the transaction manager 440 can send the job 410, including the multiple discrete transactions, to the assigned virtual warehouse for execution. Alternatively, the transaction manager 440 can send a subset of the transactions included in the job 410 for execution by the execution platform 110.

In an embodiment, as described further herein, the transaction manager 440 can perform operations to process transactions (e.g., OLTP) that may be executing concurrently, while handling conflicts and avoiding starvation of resources. Further, as described further herein, the transaction manager 440 handles conflicts between multiple transactions and concurrency issues that can arise when multiple transactions are executing in parallel on the execution platform 110. As further shown, the execution platform 110 communicates with the storage platform 104, which provides a distributed database (e.g., Foundation Database (FDB), and the like), where data can be read and written in connection with performing the transactions.

In an embodiment, the transaction manager 440 schedules and manages the execution of transactions on behalf of a client account. The transaction manager 440 may schedule any arbitrary SQL query included in a given transaction. The transaction manager 440 may assume a role to schedule the job 410 as if it is the client account rather than as an internal account or other special account. The transaction manager 440 may embody the role of, for example, an account administrator or a role having the (smallest) scope necessary to complete the job 410. In an embodiment, the transaction manager 440 embodies the role that owns the object that is the target of the job 410 (e.g., for a cluster, the table being clustered is the target).

In an embodiment, the transaction manager 440 determines transactions at 452 and assigns transactions at 454 that are to be performed to fully execute the job 410. In an embodiment, the transaction manager 440 assigns ordering constraints to any number of the one or more discrete transactions, where applicable. Depending on the constraints of the job 410, the transaction manager 440 may determine that one or more of multiple discrete transactions are to be serialized and executed in a particular order.

In an embodiment, the transaction manager 440 generates a report indicating when the job 410 is scheduled to be executed and how much computing resources are estimated to be tied up executing the job 410. The transaction manager 440 may alert a client account when the job 410 is being executed.

The database system provides concurrency control and isolation for executing transactions against (e.g., a series of SQL Statements within a SQL Transaction) against linearizable storage (e.g., a linearizable key-value store, NoSQL database, an OLAP database or data warehouse). A transaction as referred to herein includes a group of operations executed atomically. In an example, such transactions may include read and write operations but can also include operations such as increment, decrement, compare-and-swap, and the like. Further, it is appreciated that linearizable storage may include any type of distributed database (e.g., Apache HBase).

The following discussion relates to transactions in a given distributed database system. In an example, the transaction manager 440 utilizes a linearizable storage, provided by the storage platform 104, for managing and processing transactions as described herein. In an embodiment, the transaction manager 440 implements a read committed model for performing transactions. As referred to herein, a read committed model can refer to a model that ensures that all read operations performed in a given transaction sees a consistent snapshot of the database (e.g., reading a last set of committed values that existed when the read operation commenced), and the transaction itself successfully commits only if no updates that the transaction has made results in write-write conflicts with any concurrent transactions.

As discussed further herein, the transaction manager 440 implements a two-level transaction hierarchy, where a top-level transaction corresponds to a SQL transaction, and a nested transaction corresponds to a SQL statement within the parent SQL transaction. A given nested transaction can perform operations, such as reads and writes, and can perform a rollback and restart execution zero or more times before succeeding. Upon transaction commit, write operations can become visible, and write locks held by each contained statement can be released.

As mentioned before, the subject system provides concurrency control and isolation for executing a series of SQL Statements within a SQL Transaction against a linearizable storage. As discussed further herein, a transaction manager (e.g., transaction manager 440) is configured to provide a concurrency control mechanism that can be understood as a combination of multi-version concurrency control for read operations (MVCC) and locking for write operations. The subject system provides techniques for read committed isolation where each statement may execute against a different snapshot of the database (e.g., the storage platform 104), with write locks held until transaction commit.

In an embodiment, the linearizable storage as described herein enables each operation to execute atomically between invocation and response. As an example, such a linearizable key-value store ensures that operations execute in an atomic manner consistent with a "real-time" ordering of those operations e.g., when operation A completes before operation B begins, operation B should take effect after operation A. In the context of a database, a first write operation to a row in the table takes effect before a second write or read operation to the same row in the table if the second operation was issued after the first completed.

The examples described herein relate to linearizable storage such as a linearizable database, including, for example, NoSQL systems, and the like. A given NoSQL database refers to a database that stores data in a format other than a tabular format, and can store data differently than in relational tables. Further, Uber's Schemaless is an example of building linearizable Key-Value storage via having a "key" and "value" column in a relational table. Other examples of linearizable databases are: HBase, RocksDB, TiKV, Redis, Etcd.

Some examples of optimizations provided by the subject system include utilizing restricted transactional capabilities offered by some embodiments of storage platform 104, such as FoundationDB, that can be leveraged to enable a more efficient transaction implementation. For example, in a write (/lock/delete) protocol, a write operation is performed, and then a read operation is done to check for (1) any write operation that happened before the write request was submitted (2) any other write operation was submitted concurrently with the write operation that was serialized before. The following example illustrates the above:

T1 starts statement S1

S1 starts a FoundationDB Transaction, and uses its Read Version as the Read Timestamp S1 wishes to write object X, so it first reads object X as of the Read Timestamp Finding no conflicts, S1 writes X, using a timestamped operation to embed the commit timestamp in the key and setting IsCommitEmbedded.

S1 sets a read conflict range on the FoundationDB transaction for all keys with a prefix of X S1 writes a transaction status entry for ID, directly setting it to committed.

T1 commits the FoundationDB Transaction.

If the transaction commits, then there were no concurrent conflicting transactions.

If the transaction is aborted, then there was a concurrency conflicting transaction for one of the writes that were done. None of S1's writes, nor the transaction status entry will be persisted. S1 now restarts in the slow path.

In an example, a "read version" refers to a "version" or state of the database that corresponds to when a last operation was successfully committed to the database.

The following relates to a discussion of strict serializability. Whereas linearizability makes a "real-time" ordering and atomicity promise about single operations, strict serializability makes a "real-time" ordering and atomicity promise about groups of operations. In an example, the group of operations is submitted incrementally over time, with a terminal "commit" command being issued. The strictly serializable storage platform may employ techniques such as pessimistic lock-based exclusion or an optimistic validation phase to enable this functionality. In this example, the group of operations is referred to as a transaction as mentioned herein. The subject system can impose restrictions on the transaction, such as the number, size, or duration of the operations, and always reject transactions that exceed these limits.

In an embodiment, read operations may be optimized in the following manner. When reading with a given read timestamp, it may not be feasible for any transaction started after the read timestamp to commit before the read timestamp. Thus, if the Transaction ID is set to be the same as the first statement's read timestamp, then instead of reading [X.0, X.inf], the subject system can read [X.0, X.readTimestamp]. Consequently, this approach can make read operations for old or frequently written data more efficient.

In an embodiment, the subject system implements a two-level transaction hierarchy, where the top-level transaction corresponds to a SQL Transaction, and the nested transaction (referred to as a "StatementContext") corresponds to a SQL statement within the parent SQL Transaction. A given StatementContext performs read and write operations and may be instructed to perform a rollback and restart execution zero or more times before succeeding. In an example, transactions control the collective visibility of all write operations from successful statements. Upon transaction commit, all write operations become visible, and all write locks held by each contained statement are released.

In an embodiment, each object key is associated with a stamp that uniquely identifies a single execution attempt of a statement, which can be by appending a three-part tuple of (Transaction ID, statementNumber, restartCount). The higher order component is the transaction identifier assigned to the SQL-level transaction. The statementNumber identifies the SQL statement within the SQL-level BEGIN/COMMIT block. The restart count tracks which statement restart attempt generated this write operations. A StatementContext is instantiated with this stamp, and applies it to all writes performed through the StatementContext instance.

Stamping keys this way has a number of desirable properties. First, if key1<key2, then key1.suffix1<key2.suffix2, regardless of the values of suffix1 and suffix2. If key1==key2, then the transactionID component of the suffix allows us to resolve the commit status of the object to determine its visibility to the statement. If transactionID1==transactionID2, then Statement Number allows statements to see writes performed by previous statements within the same transaction. The restartCount component of the suffix enables the system to detect and delete obsolete versions of the object that had been left around when a statement has to be restarted.

In a similar fashion each execution of a statement is given a three-part identifier consisting of the statement's read-Timestamp (RTS) and the current values of statementNumber (SN) and restartCount (RC). This approach ensures that each statement that is part of the execution of a SQL statement (or more generally a SQL Transaction), sees either data committed before the SQL statement started or by data written or updated by the transaction itself.

In an embodiment, the transaction manager employs a Transaction Status Table (TST) to keep track of committed and aborted transactions. The TST is a persistent hashmap that maps Transaction ID to its metadata, most notably a list of finalized statement numbers and their final restart count, and the commit outcome including the transaction's commit timestamp (CTS). Transactions that are in progress do not exist in the Transaction Status Table. In an embodiment, the TST can be stored in the storage platform 104, or within memory or cache of the execution platform 110.

The following discussion relates to a read protocol that is utilized by the transaction manager 440.

In an embodiment, the transaction manager 440 uses a read committed transaction isolation level, and each statement may be run with a different read timestamp. In an example, the read request for a given key (or a range of keys) is implemented by executing a linearizable storage read call for all keys with X as their prefix. The call returns versions of X with their stamps and values. The read method returns either the latest version of X made by a transaction that committed before the SQL statement started or which was written by the most recent statement of the transaction itself that was not canceled (if any).

The following discussion relates to a write protocol that is utilized by the transaction manager 440.

In an embodiment, the write protocol checks both for WW (write-write) conflicts and WW deadlocks. The following example describes a single transaction and no conflicts. Assume that object X initially has a stamp of TXN1.0.0 and was committed at timestamp 10. In the following example, it should be understood that the following transactional steps described further below can be done within one transaction, and collectively committed. On failure, or upon exceeding the limitations of the underlying transactional system, the execution can fall back to issuing the operations individually as described in further detail below.

T2 starts and creates S1 of StatementContext(ID=TXN2, Statement Number=1, restartCount=0)

Assume that the constructor obtains a read timestamp from the linearizable storage of 15 by contacting the clock service 130. As mentioned before, the clock service 130 is a component of the storage platform 104 which can be contacted to fetch a number that will be greater than any number previously returned, such as one that correlates to the current time. In an embodiment, clock service 130 is provided separately and is independently contactable from the linearizable storage, or can be integrated into the linearizable storage such that the clock value may be inserted into a written value. The latter operation will be referred to as a timestamped write.

To update value of X, the following sequence of actions is performed in an embodiment:

{
   S1 does a linearizable storage write for X.TXN2.1.0 with a value of 100
   // The next step is for S1 to check for WW (write-write) conflicts by checking whether there is
   // another transaction that has updated X between the RTS and S1's write.
   S1 issues the range read [X.0, X.inf] to obtain the set all versions of X and their stamps
   The read returns [X.TXN1.0.0, X.TXN2.1.0].
   S1 looks up TXN1 in the Transaction Status Table, finds a commit timestamp of 10.
   10 is earlier than our read timestamp of 15, so it is not a conflict.
   S1 ignores [X.TXN2.1.0] as it belongs to S1
   // Assume for now, there were no conflicts detected
   S1 finalizes, and records (statement number=1, restart count=0) into the transaction status table for TXN2
}

T2 commits. This will cause the Transaction Status Table record to be updated in linearizable storage to reflect that TXN2 is now committed and its commit timestamp of 20.

At this point there will be two versions of X, one stamped with TXN1.0.0 and the other TXN2.1.0. Subsequent transactions that read X can determine if this new version of X was written by a committed transaction by reading the transaction status record, and determine the CTS of the transaction.

The write protocol for transaction T can now be stated.

In an implementation, each row (object) updated uses two separate linearizable storage transactions:

1) The first linearizable storage transaction of T inserts a new version of the object with its key X suffixed with three-part suffix (T.ID, T.statementNumber, T.restartCount).
2) The second linearizable storage transaction issues a range read with the prefix "X." to obtain the SCT (set of conflicting transactions). The result set is a list of committed or active transactions that wrote (or are writing) new versions of X.

There are a number of possible distinct outcomes to this linearizable storage read call that are evaluated in the following order:

1) SCT is empty in which case T is trivially allowed to proceed.
2) SCT is not empty, but for all Ti in SCT, Ti has committed before T's read timestamp, and thus are not WW (write-write) conflicts. T may proceed.
3) SCT is not empty; for all Ti in SCT, Ti is committed; and there exists a Ti in SCT, such that its CTN is greater than T's read timestamp. T is permitted to restart without delay.
4) SCT is not empty, and for one or more Ti in SCT, Ti has not yet committed or aborted. T waits for all transactions in SCT to complete before restarting the current statement.
5) SCT is not empty, and for one or more Ti in SCT, Ti.TransactionID is the same as our own transaction ID, and Ti.StatementCount is less than our current statement count. This means that currently the lock is held, as a previous statement took it and successfully finished its execution. T may proceed.
6) SCT is not empty, and for one or more Ti in SCT, TI.TransactionID is the same as our own transaction ID, Ti.StatementCount is the same as our own StatementCount, and Ti.RestartCount is less than our own restart count. This is a lock from a previous execution of our own transaction, thus T holds the lock on this row, and T may proceed.

For all cases, the object (X.Stamp, Value) will be left in the database (e.g., the storage platform 104). For (3) and (4) which require restarts, the object is left to serve as a write lock. In general, all tentative writes for an object X will form a queue of write locks. (5) and (6) illustrate the cases where previously left write locks allow subsequent statements or restarts of a statement to recognize that they already hold the lock that they wish to take.

The following discussion describes an example that illustrates a write-write (WW) conflict. A write-write conflict, which is also understood as overwriting uncommitted data, refers to a computational anomaly associated with interleaved execution of transactions. To simplify the example, stamps are omitted. Assume that before either T1 or T2 starts that object X has a value of 500, a stamp of TXN1.0.0, and a CTN of 10.

T1 starts and gets a read timestamp of 15
  T2 starts and gets a read timestamp of 20
  T2 writes (key=X.T2, value=100)
  T2 issues a linearizable storage read with range [X.0, X.Inf]. The set SCT will be empty so T2 continues
  T1 writes (key=X.T1, value=50)
  T1 issues a linearizable storage read with range [X.0, X.Inf]. The set SCT will contain T2 so T1 must restart
  T2 successfully commits. T1's CTN for X will be >20. Assume it is 21
  After waiting until T2 either commits or aborts, T1 restarts the statement with a read TS>21.

The following discussion relates to a delete protocol utilized by the transaction manager 440.

In an embodiment, delete operations are implemented as a write of a sentinel tombstone value; otherwise, delete operations employ the same protocol as write operations. When a read operation determines that the most recently committed key is a tombstone, it considers that key to be non-existent.

The following discussion relates to a lock protocol utilized by the transaction manager 440.

To support a query statement of SELECT . . . FOR UPDATE, the transaction manager API offers StatementContext::lock(Key), which allows rows to be locked without writing a value to them. The implementation of lock( ) follows the write protocol, except that it writes a special sentinel value to indicate the absence of a value (distinct from SQL NULL). A SELECT . . . FOR UPDATE statement may also be forced to restart several times before the statement finishes successfully. Once it does, subsequent statements in the transaction will recognize the existence of this key as an indication that they hold the lock (in accordance with cases (5) and (6) above). All reads can ignore the key as a write.

The following discussion relates to determining whether to commit, abort, or restart a given transaction which can be determined by the transaction manager 440.

When a transaction finishes its execution, it will either have an empty SCT, indicating that the commit can proceed, or an SCT with one or more conflicting transactions, indicating that the transaction will need to restart.

When a statement is restarted, all writes stamped with a lower restartCount are left in the database (e.g., the storage platform 104) as provisional write locks for the next execution. The next execution of the statement might write a different set of keys. The set difference between the first and second execution form a set of orphaned writes that are removed and never become visible. The statement itself may not be relied upon to always be able to clean up its own orphaned writes, as in the event of a process crash, the location of the previous writes will have been forgotten. Finalizing statements and recording the restart count of the successful execution promises that only the results of one execution will ever become visible, and permits orphaned writes to be lazily cleaned up.

A transaction is committed, and all of its writes made visible, by inserting its Transaction ID into the Transaction Status Table. The commit timestamp is filled in by the clock service 130 or directly by the distributed database (e.g., FoundationDB), such that it is higher than any previously assigned read or commit timestamps. All writes are completed before a statement may be finalized, and all statements are finalized before the transaction may be committed.

A transaction is aborted by inserting its Transaction ID into the Transaction Status Table, with its transaction outcome set as aborted. The list of finalized statements and their restart counts will be reset to an empty list. The insertion into the Transaction Status Table will make the abort outcome visible to all conflicting transactions, and all writes performed by finalized statements may be proactively or lazily removed from the database (e.g., the storage platform 104).

When a statement tries to finalize with a non-empty SCT, it waits for commit outcomes to be persisted to the Transaction Status Table for all conflicting transactions. Once all conflicting transactions have committed or aborted, then the transaction will begin its restart attempt.

The following discussion relates to an API (e.g., the transaction manager API as referred to below) that can be utilized (e.g., by a given client device) to send commands and requests to the transaction manager 440.

A SQL transaction contains a sequence of one or more SQL statements. Each SQL statement is executed as a nested transaction, as implemented by the transaction manager StatementContext class. Each transaction manager statement itself is executed as one or more database transactions.

In an embodiment, the transaction manager API is divided into two parts: 1) the data layer, which provides a read and write API to the transaction execution processes; and 2) the transaction layer, which provides, to the compute service manager 108, an API to orchestrate the transaction lifecycle. In an implementation, transactions operate at a READ COMMITTED isolation level and implement MVCC on top of the distributed database (e.g., storage platform 104) to avoid taking any read locks.

Consider the following example SQL query:

Update emp.Salary=emp.Salary*1.1 where
emp.Dept="shoe";

In an example, an instance of the StatementContext class will be created to execute this SQL statement. The constructor contacts the linearizable storage transaction manager to begin a linearizable storage transaction and obtain a linearizable storage STN which is then stored in the readTimestamp variable.

The Update operation then executes across any number of execution nodes, all using the same StatementContext instance. In an example, a function rangeRead( ) will be used to scan the base table, or an index on Dept, for the tuples to update. A series of write( ) calls will be made to update the salary of all matching employees.

A call to finalize( ) will return CONFLICT if the statement encountered any conflicts during its execution, to indicate that re-execution is needed. The key to restarts making progress is that the first execution of the statement will have the side effect of, in effect, setting write locks on the objects being updated. This ensures that when the statement is re-executed the necessary writes locks have already been obtained and the statement will generally (but not always).

Next, consider an example illustrating Write-Write conflicts between 3 transactions:

T1 starts S1 with timestamp 10
T2 starts S2 with timestamp 20
T3 starts S3 with timestamp 30
S1 writes X
S2 writes Y
S3 writes Z
S1 writes Y, and notes the conflict with T2
S2 writes Z, and notes the conflict with T3
S3 writes X, and notes the conflict with T1

In this case described above, three transactions are involved in a deadlock. Each statement believes that it should restart and wait for the execution of the previous transaction to finish. No transaction has the complete information to know that it is involved in a deadlock.

Thus, when a statement fails to finalize due to conflicts, it instead writes its conflict set into the database (e.g., the storage platform 104). These conflict sets may be read by all other transactions, allowing them to detect a cycle in the waits-for graph, indicating that they're involved in a deadlock.

In database systems, a deadlock can refer to a situation where two or more transactions are waiting for one another to give up locks. As an example, deadlocks can be handled by deadlock detection or prevention in some embodiments. The following discussion relates to example mechanisms for handling deadlocks utilizing distributed approaches that do not require a centralized deadlock handling component or implementation. For example, in an implementation, a particular execution node, (e.g., execution node 302-1 and the like) in the execution platform 110 can perform at least some of the following operations described below.

Deadlock detection: A basic idea of deadlock detection is to detect a deadlock after the deadlock occurs such that that a particular transaction can be aborted. This can be done by finding cycles in a wait-for graph. Depending on how deadlock detection is performed, deadlock detection can be classified as:

Online detection: whenever a transaction wishes to acquire a lock, it adds an edge to the wait-for graph. The transaction is aborted if this new edge will cause a cycle.

Offline detection: the system periodically collects the pending lock requests from all transactions to construct a wait-for graph and perform cycle detection.

Deadlock prevention: A basic idea of deadlock prevention is to enforce some restrictions on locking so that deadlocks can never happen. Example techniques include:

Timeout: a transaction is assumed to be involved in a deadlock if its lock request cannot be granted after a certain time period, e.g., 5 seconds.

Non-blocking 2PL: whenever a conflict happens, a transaction is aborted immediately.

Wait-die: when a transaction Ti requests a lock that is held by Tj, Ti is only allowed to wait if Ti is older than Tj. Otherwise Ti is aborted immediately.

Wound-wait: when a transaction Ti requests a lock that is held by Tj, Tj is aborted if Ti has a higher priority than Tj. Otherwise, Ti will wait.

In embodiments, the database system implements a distributed database (e.g., storage platform 104) for executing distributed transactions, and utilizes locking for concurrency control where any deadlocks are handled in a distributed manner by a particular execution node executing a particular transaction (e.g., execution node 302-1 and the like).

In some embodiments, the database system provides the following:

No false deadlocks: Deadlocks generally represent some bugs in the user's application code. By providing accurate and informative deadlock information, embodiments of the database system enables a user to fix these deadlocks.

Distributed/decentralized deadlock handling: transaction manager 440 is designed for executing distributed transactions in the cloud. In an embodiment, the transaction manager 440 creates one job (with one or more execution node workers) to execute a transaction. It can be desirable that each transaction handles deadlocks independently without requiring a centralized transaction manager.

The following discussion describes a deadlock detection and resolution protocol for the database system to meet the two aforementioned requirements. In order to meet the goal of no false deadlocks, the database system performs deadlock detection on the wait-for graph and only aborts a transaction if it finds a cycle in the graph. To meet a goal of not utilizing a centralized transaction manager, each transaction (e.g., executing on a given execution node) are able to exchange wait-for information and perform deadlock detection independently. Further, the database system implements a deadlock detection algorithm that is deterministic so that all transactions can unanimously agree on which transactions to abort.

In the following discussion, it is understood that statements in a transaction are executed serially e.g., one at a time. As discussed further below, the database system can then extend a deadlock detection protocol as described herein to support parallel statement execution.

In the discussion below, "transaction" and "statement" are used interchangeably because it is assumed that statements of a transaction will be executed serially, e.g., one at a time. In an example, the database system utilizes a deadlock detection and resolution protocol that enables transactions to store their wait-for information into a dedicated table in a distributed database (e.g., storage platform 104). A transaction waiting for conflicting transactions can periodically run a deterministic deadlock detection algorithm. If a transaction determines that it is a victim in a deadlock, the transaction can abort itself so that other transactions can proceed.

In some implementations, the execution platform 110 can provide deadlock handling logic 480 (e.g., deadlock handling logic 1 to deadlock handling logic N, which can correspond respectively to each transaction 420 to transaction 425) which implements the deadlock detection and resolution protocol mentioned herein, and is provided or utilized by each given execution node that is currently executing a given transaction(s). In another embodiment, each deadlock handling logic can be provided to a corresponding transaction (or statement within a transaction) for deadlock detection and resolution as described further herein.

In an embodiment, wait-for information of transactions is stored in a wait-for table in the distributed database (e.g., storage platform 104). The wait-for table includes a set of key-value pairs where both keys and values are transaction IDs. A key-value pair <Ti, Tj> means that Ti is currently waiting for Tj, e.g., there is an edge Ti->Tj in the wait-for graph.

In order to satisfy the deterministic requirement, each transaction Ti reports Ti->Tj only if Tj is the oldest conflicting transaction that Ti is waiting for (a transaction's age is determined by its transaction ID, e.g., a younger (e.g., newer) transaction will have a larger transaction ID). By ensuring that there is at most one ongoing edge from each transaction, it is straightforward to see that each transaction can participate in at most one cycle. Thus, the youngest transaction (with the largest transaction ID) can be aborted in each cycle to deterministically resolve deadlocks.

Figure 5:
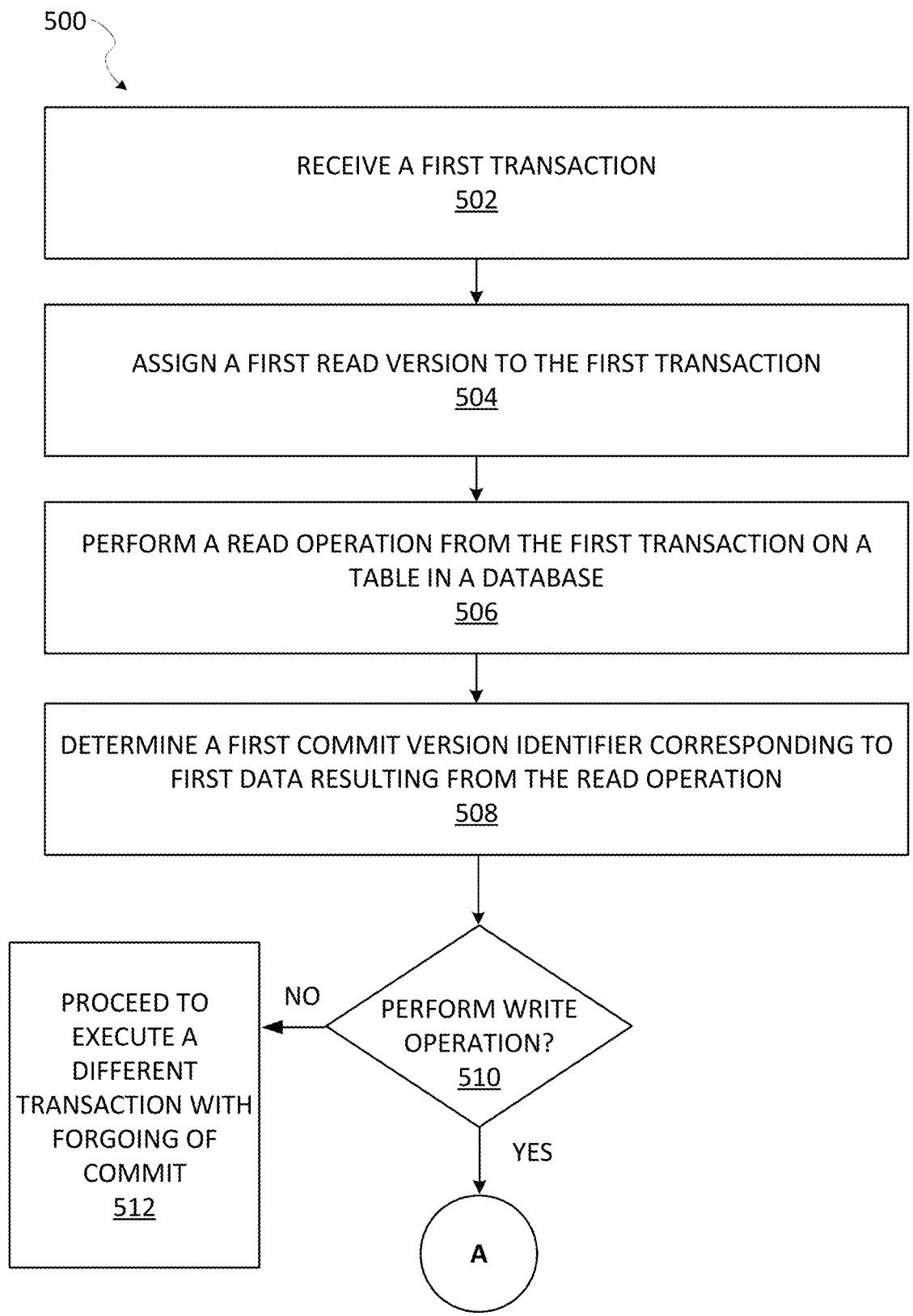
FIG. 5 is a flow diagram of method for implementing database transactions, in accordance with some embodiments of the present disclosure.

FIG. 5 is a flow diagram illustrating operations of a database system in performing a method, in accordance with some embodiments of the present disclosure. The method 500 may be embodied in computer-readable instructions for execution by one or more hardware components (e.g., one or more processors) such that the operations of the method 500 may be performed by components of network-based database system 102, such as components of the compute service manager 108 or a node in the execution platform 110. Accordingly, the method 500 is described below, by way of example with reference thereto. However, it shall be appreciated that the method 500 may be deployed on various other hardware configurations and is not intended to be limited to deployment within the network-based database system 102.

At operation 502, the transaction manager 440 receives a first transaction that is to be executed on linearizable storage.

At operation 504, the transaction manager 440 assigns a first read version to the first transaction. The first read version indicates a first version of the linearizable storage. Alternatively, a read timestamp can be retrieved from a clock service (e.g., the clock service 130), and a transaction identifier can be assigned to the first transaction where the transaction identifier corresponds to a read start time.

At operation 506, the transaction manager 440 performs a read operation from the first transaction on a table in a database.

At operation 508, the transaction manager 440 determines a first commit version identifier corresponding to first data resulting from the read operation.

At operation 510, the transaction manager 440 determines whether a particular write operation is included in the first transaction. If the particular write operation is to be performed with the first transaction, then the transaction manager 440 proceeds to perform a method as described below in FIG. 7.

Alternatively, when the transaction manager 440 determines that a particular write operation is absent from the first transaction, at operation 512, the transaction manager 440 proceeds to execute a different transaction (along with forgoing performance of a commit process for the first transaction), which is described, in an example, in FIG. 6 below. It is appreciated that due to the concurrency of transactions that are performed, the operations described further below in FIG. 6 can be executed at any time during the operations described in FIG. 5 above.

Figure 6:
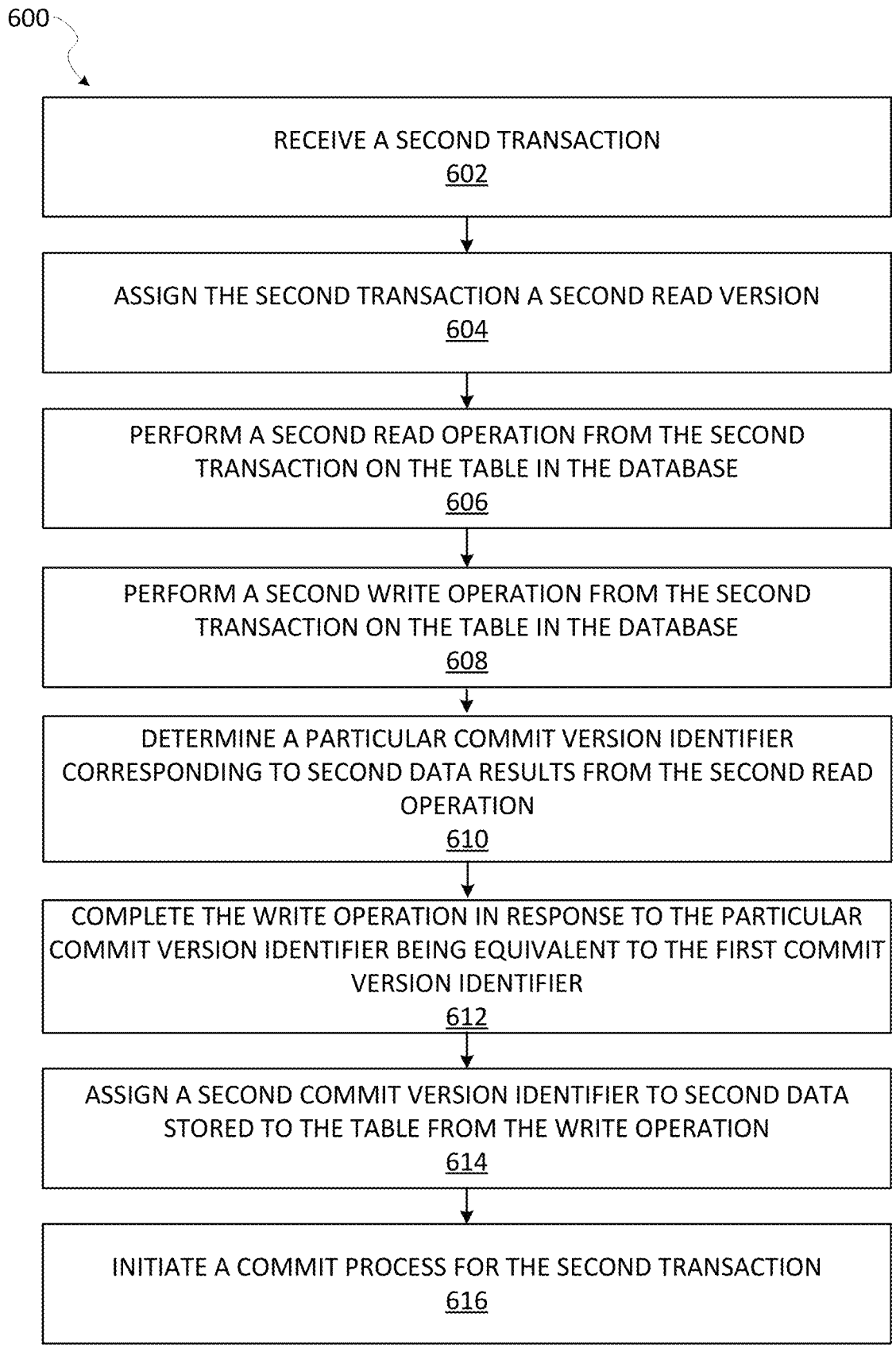
FIG. 6 is a flow diagram illustrating operations of a database system in performing a method, in accordance with some embodiments of the present disclosure.

FIG. 6 is flow diagram illustrating operations of a database system in performing a method, in accordance with some embodiments of the present disclosure. The method 600 may be embodied in computer-readable instructions for execution by one or more hardware components (e.g., one or more processors) such that the operations of the method 600 may be performed by components of network-based database system 102, such as components of the compute service manager 108 or a node in the execution platform 110. Accordingly, the method 600 is described below, by way of example with reference thereto. However, it shall be appreciated that the method 600 may be deployed on various other hardware configurations and is not intended to be limited to deployment within the network-based database system 102.

In some embodiments, the method 600 can be performed in conjunction with the method 500 as discussed above. For example, the method 600 can be performed after the operations of the method 500 or performed substantially concurrently with the method 500.

At operation 602, the transaction manager 440 receives a second transaction to be executed on linearizable storage.

At operation 604, the transaction manager 440 assigns the second transaction a second read version that indicates a second version of the linearizable storage.

At operation 606, the transaction manager 440 performs a second read operation from the second transaction on the table in the database.

At operation 608, the transaction manager 440 performs a second write operation from the second transaction on the table in the database.

At operation 610, the transaction manager 440 determines a particular commit version identifier corresponding to second data results from the second read operation.

At operation 612, the transaction manager 440 completes the write operation in response to the particular commit version identifier being equivalent to the first commit version identifier.

At operation 614, the transaction manager 440 assigns a second commit version identifier to second data stored to the table from the write operation, the second commit version identifier corresponding to a second version of data in the table. The second commit version identifier is different than the first commit version identifier.

At operation 616, the transaction manager 440 initiates a commit process for the second transaction.

Figure 7:
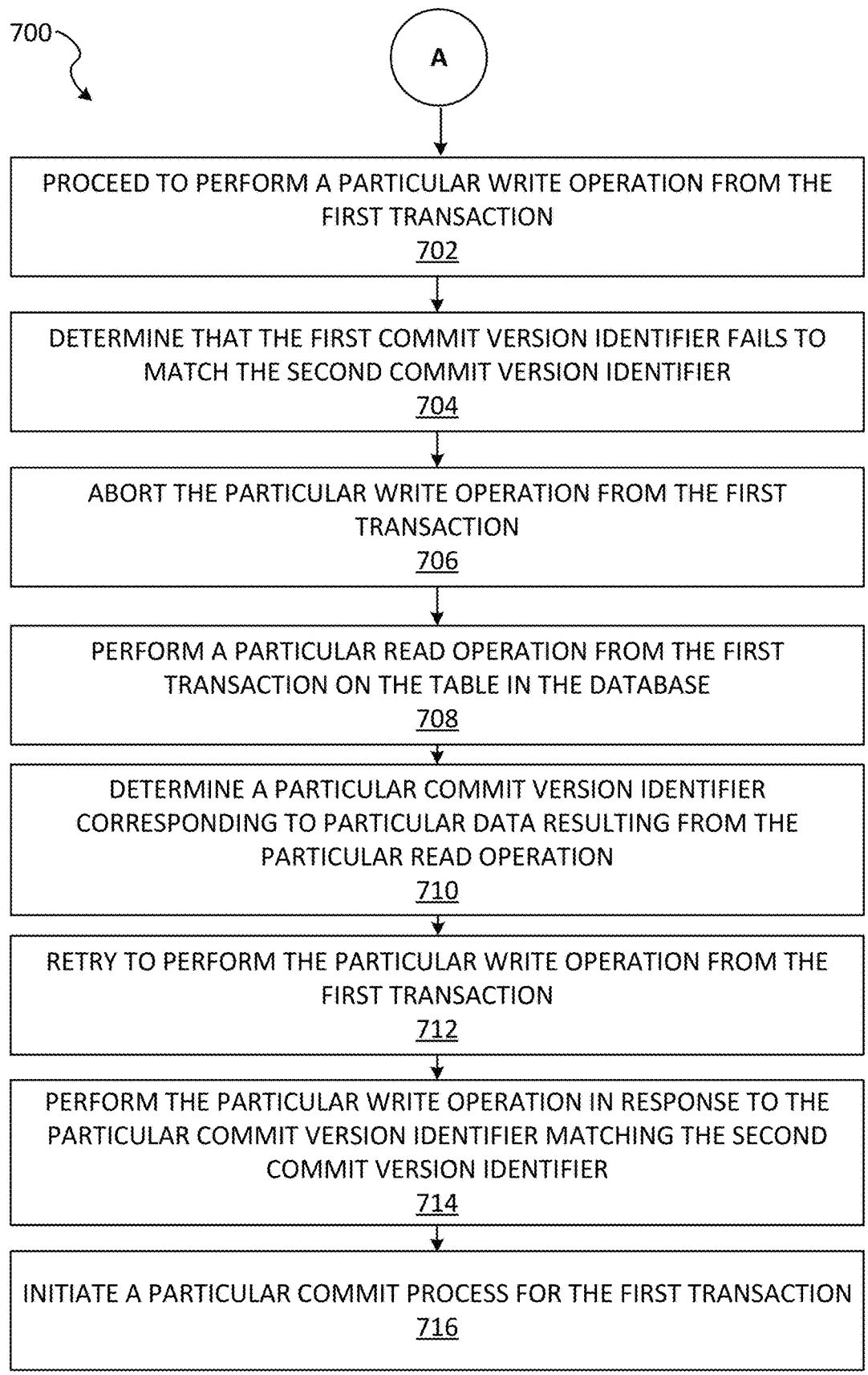
FIG. 7 is a flow diagram illustrating operations of a database system in performing a method, in accordance with some embodiments of the present disclosure.

FIG. 7 is a flow diagram illustrating operations of a database system in performing a method, in accordance with some embodiments of the present disclosure. The method 700 may be embodied in computer-readable instructions for execution by one or more hardware components (e.g., one or more processors) such that the operations of the method 700 may be performed by components of network-based database system 102, such as components of the compute service manager 108 or a node in the execution platform 110. Accordingly, the method 700 is described below, by way of example with reference thereto. However, it shall be appreciated that the method 700 may be deployed on various other hardware configurations and is not intended to be limited to deployment within the network-based database system 102.

In some embodiments, the method 700 can be performed in conjunction with the method 500 and the method 600 as discussed above. For example, the method 700 can be performed after the operations of the method 500 or the method 600 (or performed substantially concurrently therewith either method). At operation 702, the transaction manager 440 proceeds to perform a particular write operation from the first transaction. At operation 704, the transaction manager 440 determines that the first commit version identifier fails to match the second commit version identifier. At operation 706, the transaction manager 440 aborts the particular write operation from the first transaction. At operation 708, the transaction manager 440 performs a particular read operation from the first transaction on the table in the database. At operation 710, the transaction manager 440 determines a particular commit version identifier corresponding to particular data resulting from the particular read operation. At operation 712, the transaction manager 440 retry to perform the particular write operation from the first transaction. At operation 714, the transaction manager 440 perform the particular write operation in response to the particular commit version identifier matching the second commit version identifier. At operation 716, the transaction manager 440 initiates a particular commit process for the first transaction.

In some example embodiments, a given execution node (e.g., execute node 302-1) represents a set of table rows as a row set class (e.g., C++ Class Rowset). In some example embodiments, logically, the rowset class is a vector of one or more column sets, which is also a vector of column values, where every column set represents a particular column in a SQL table. In some example embodiments, the hybrid database serializer system 230 operates on row sets to perform table row serialization into key-value pairs.

In some example embodiments, every row in a row set will be serialized into a single key-value pair for transactional processing in the OLTP database of a hybrid database system. The primary columns of a table are used to generate the key part of a key-value pair for the underlying key-value store; whereas the value part will be formed out of the remainder non-primary key columns' values. In some example embodiments, the primary key part is encoded and serialized using a tuple layer, and the non-primary key columns are encoded and serialized using a flexible and flexible approach.

In some example embodiments, the primary key data is encoded and serialized in an order encoding approach. In some example embodiments, every key-value table that stores transactional data has a primary key. In some example embodiments, a primary key of a table cannot change, and further adding a key column to an existing table or removing a key column from an existing table is not enabled. In some example embodiments, a table's primary key can only be specified once in the CREATE TABLE statement (e.g., it cannot be changed later using ALTER TABLE). In some example embodiments, for a given row in a table, the key is generated using the following logical format, where forward-slash is used as a visual separator between values in the key):

Key=tableID/indexID/primary-key columns/pieceID

In the above format, table ID is a unique identifier across all accounts. The index ID is the ID of the primary-key index. The primary-key columns are values of all columns forming the primary key. In some example embodiments, the values are concatenated to each other in respect to the order of succession of their respective columns in the primary key definition. The piece ID: in some example embodiments, the transactional database system implements a limit on value sizes, and the values are split into pieces across a set of contiguous keys, which are then reconstructed when deserializing the values, where each piece has a pieceID that is encoded as a key suffix.

Figure 8:
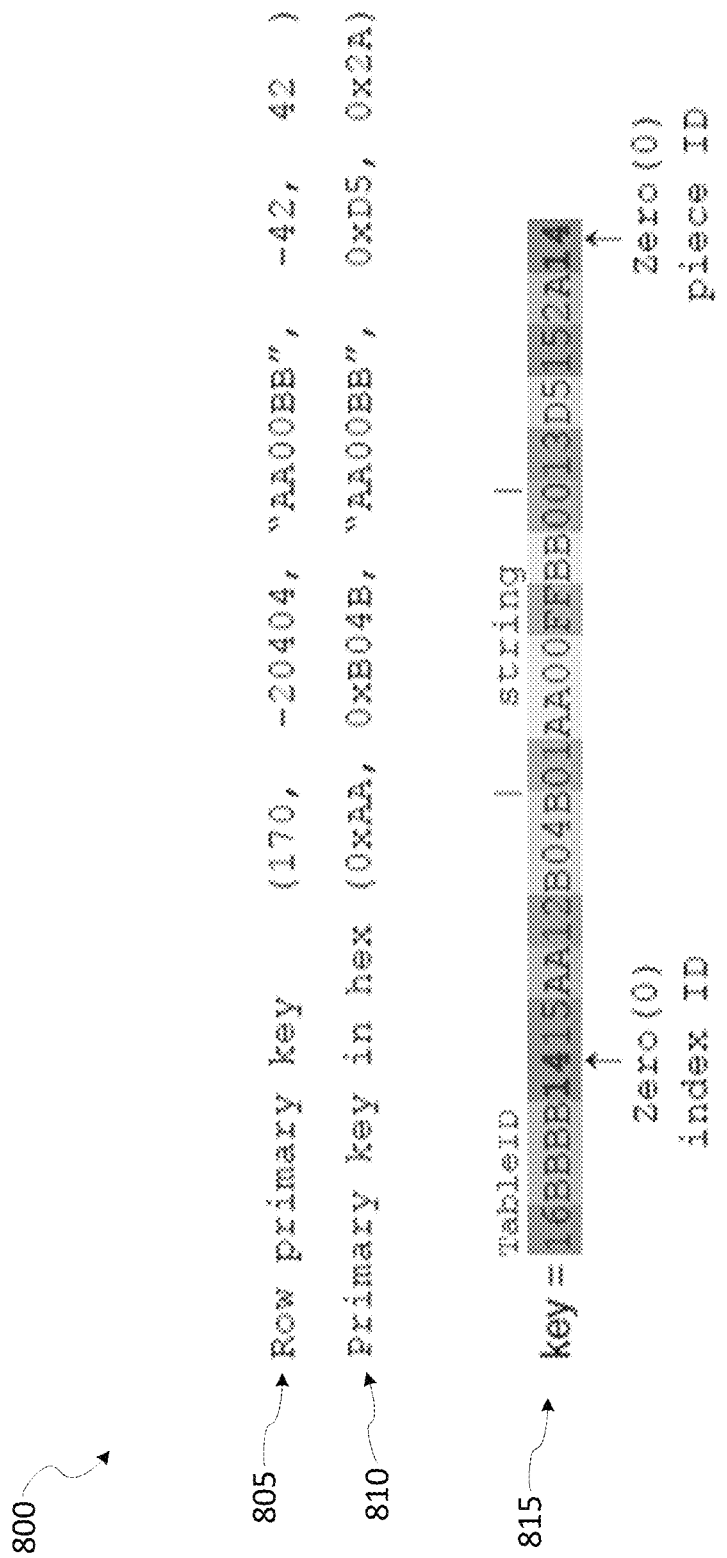
FIG. 8 shows key serialization, in accordance with some embodiments of the present disclosure.

FIG. 8 shows an example key serialization data architecture 800, according to some example embodiments. In FIG. 8, the key serialization output 815 is generated by the hybrid database serializer system 230 by serializing the row primary key 805, where primary key in hex 810 is included for explanatory purposes. In the illustrated example of FIG. 8, the table has an ID of 48059 (0xBBBB in hex) and has a primary key that is composed of five columns: four integers and one string. The table ID "48059" is the prefix of the key, it is shown as a positive number: 0x16BBBB. The byte string "AA00BB" is encoded as 01AA00FFBB00. In some example embodiments, zero is encoded using special code 0x1

In some example embodiments, encoding and serialization of the values (e.g., non-primary key data) is configured to avoid processing of column data already encoding in the key to avoid duplication of data. In some example embodiments, the hybrid database serializer system 230 is configured to split the row data into smaller sizes (e.g., 70 bytes, 150 bytes) before transmission to and processing by the transactional manager 440. In some example embodiments, row data that is larger than a preconfigured size (e.g., 70 bytes, 150 bytes) is split into pieces and managed using piece IDs, as discussed above. In some example embodiments, compression is performed using automatic fast compression algorithm (e.g., Snappy) with additional compression, where the compression configuration is recorded in the value format (e.g., in a compression bit), as discussed below.

In some example embodiments, database operations (e.g., table scan) only needs access to a subset of columns in a table, and the hybrid database serializer system 230 is configured to reference column data in the value format to enable efficient location and deserialization of only data related to a given process or transaction, without requiring deserialization and unpacking of the entire table, which may be large and slow to process (e.g., 10,000 column table).

In some example embodiments, for a given row in a table, the value part of its corresponding key-value pair is produced using the following logical format (forward-slash is used as a visual separator between values):
  Row Format: Schema ID/Header/Row data
  Header: Row properties/Column properties
  Row Properties: Compression bit/Null bit/Sign bit/Sign bits
  Column Properties: Null bitmap/Sign bitmap/Size map
  Row Data: Numbers values/Lob values.

Row Format comprises a schema ID followed by two main sections: a header for metadata and then the data itself. The Schema ID is a variable-length integer representing a unique identifier of the schema that is used to encode, serialize, and deserialize rows. The schema has information that is used in the processing of value data. For example, the schema comprises a list of columns along with their IDs and types that are implemented to pack or unpack a column value.

Header: the row format starts with a header that describes the basic structure of the row data once serialized. For example, it contains information about null values, column sizes, compression, and so on. In some example embodiments. The header has two sub-sections: one for row properties and another for column properties. In some example embodiments the row properties and the column properties are implemented for compression (e.g., using bitmaps, and further compression by a compression application, such as Snappy).

Row properties: these are global properties about the row as a whole. They include the following information to implement the bitmap compression scheme: (A) a compression bit, (B) a null bit, (C) a sign bit, and (D) size bits, which are implemented to perform bitmap compression. (A) The compression bit is a single bit indicating whether the lob values section of the row data is compressed (e.g., additionally compressed via Snappy, on top of the bitmap compression), in accordance with some example embodiments. (B) The null bit (e.g., null existence bit) is a single bit that is set to 0 if none of the columns value is null, otherwise it is set to 1 to indicate that at least one column is null. In some example embodiments, this is implemented to as an optimization to determine whether to include the null-indicator bitmap in the output buffer when serializing. Before the deserialization process this value indicates whether the null bitmap is present in the buffer. (C) The sign bit (or signed (negative) numbers existence bit) is a single bit that is set to 0 if all columns are positive numbers. In some example embodiments, it is only applied to integer columns (e.g., those with SBxxx physical types) excluding float and double numbers, and otherwise it is set to 1 (e.g., at least one integer column is negative), which is a similar optimization to the null bit. In some example embodiments, the sign bit implemented to determine whether to include the sign-indicator bitmap in the serialized buffer. (D) The size bits is a 2-bit encoded integer that is used to indicate the number of bits needed to represent the minimum number of bytes needed to store the size of a column, in particular scalar columns. In the database system 102, the value of a fixed size scalar column (e.g., not a string or a binary lob) is at most 16 byte long and can store all the fixed size physical types (e.g., integers, float or double). In some example embodiments, the number 16 is represented using 4 bits which itself is encoded using only 2 bits. In some example embodiments, the 2-bit value is used to determine the total size of the "size map". For example, if a row has N non-primary key scalar columns and the maximum value among those columns holds in a minimum of n bytes, then N×m bits is needed to store the size map, where m is the number of bits needed to represent n. In this way, it assured that the "size map" is stored in as compact a manner as possible.

Column properties: The column properties section comprises two optional bitmaps and a mandatory map. The three maps are used to efficiently access, extract, and convert column values from the row data section: (A) Null bitmap: a contiguous set of N bits used to indicate whether or not values are null. N is the number of non-primary columns in the row. If bitmap[i+1] is set to 1 then it indicates that the value of column[i] is null otherwise not null. The presence of this bitmap depends on the value of the null existence bit, in accordance with some example embodiments. (B) Sign bitmap: is a contiguous set of M bits used to indicate whether or not values are negative. M is the number of non-primary integer columns in the row. If bitmap[i+1] is set to 1 then it indicates that the value of integer column[i] is negative. (C) Size map: a contiguous set of N cells used to store column sizes. N is the number of non-primary columns in the row. In some example embodiments, the size of a cell is 4 bits per column. This is because the size of a number column is at most 16 byte long, and 16 can be represented using 4 bits. The number of bits per column is saved in the "size bits" global row property described above. The size of the "size map" is N×"size bits". map[i+1] gives the size of either the value of column[i] if the latter is a scalar or its offset if it is a lob.

Row Data: The row data section is where the row data is packed. In some example embodiments, two consecutive blocks are implemented. In the first block, all number columns are packed together, and in the second block store the strings and binary lobs: (A) Number values: this part stores N consecutive numbers where each number is either: the value of the column when the column is not a string or a binary lob, or the end offset of where a lob column is stored. (B) Lob values: this part stores values for string and binary lob columns. The offset for a given lob is relative to the first character of the first lob in the buffer. The start offset of the first lob is zero and it starts just after the previous section used to store number values.

Figure 9:
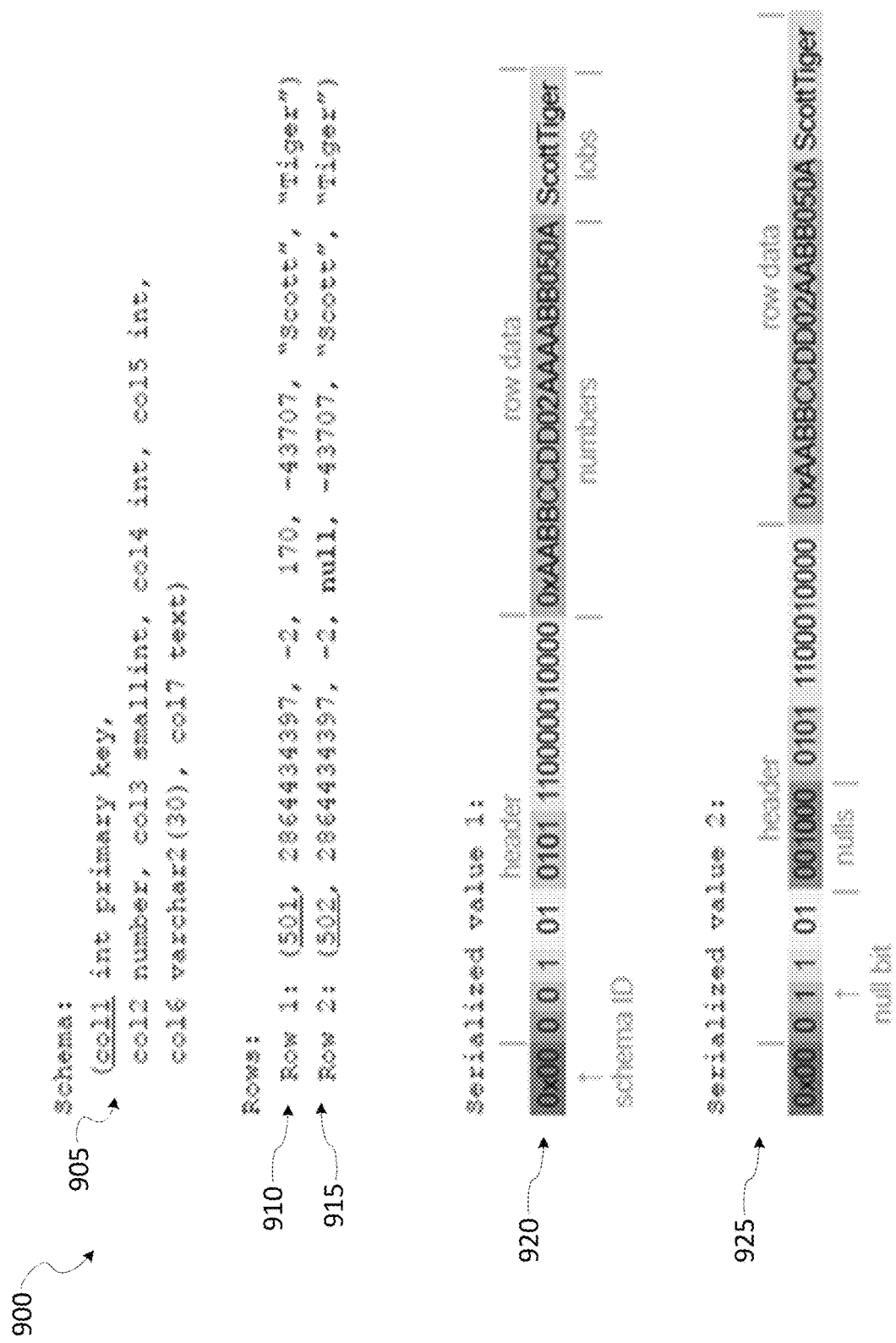
FIG. 9 shows value serialization, in accordance with some embodiments of the present disclosure.

FIG. 9 shows an example value data architecture 900 of formatting rows using the hybrid database serializer system 230, in accordance with some example embodiments. In the illustrated example, two rows are serialized, a first row 910 and a second row 915, which have a schema 905. The hybrid database serializer system 230 serializes the first row 910 to generate first row serialization output 920. In the first row, "501" is the primary key of the first row, and is not included in the serialized value to avoid data duplication. As such, for the first row 910, the actual row/tuple to serialize is: Row (2864434397, −2, 170, −43707, "Scott", "Tiger").

The first value of the first row serialization output 920 is the schema ID, which is a variable length integer. It is equal to 0 (shown as hexadecimal "0x00" in 920) which means that: (a) it is stored using 1 byte, and (b) the serialization was based on version 0 of the table schema (e.g., initial schema).

The second value of the first row serialization output 920 is the compression bit. It is set to 0 meaning the lob section of the buffer has not been compressed. Further, in the first row 910, the null bit is 0, e.g., the row does not have any null column. Therefore, the bitmap for null indicators is encoded (not needed) in the first row serialization output 920.

The sign bit is also set to 1 indicating the presence of the sign bitmap. In the 920, the 2-bit byte min size section has a binary value of 01 (1 in decimal), which means that 2 bits (e.g., 1+1) are enough to store number widths in the size map. In fact, the minimum number of bytes required to store all row numbers is 4. The size of the map is 5×2=10 bits (5=3 integer columns+2 lob offsets). Further, in the sign bitmap points out that 2 out of 4 integer columns have negative values: the second and the fourth column.

The size map is shown using binary values. Number widths (including string offsets) are stored using 2 bits each. 3 different widths are used: 4 bytes (binary 11+01=3+1 decimal), 2 bytes (binary 01+01=1+1 decimal) and 1 (binary 00+01=0+1 decimal). Further, the "2864434397" value is represented using its hexadecimal value 0xAABBCCDD which requires 4 bytes to store.

The "−2" in 920 is encoded using the hexadecimal of its absolute value: 0x02 which only requires 1 byte. The "170" in 920 is shown as 0xAA; it is a positive integer stored on 1 byte. Further, the "−43707" value, similar to "−2" value, it is represented using the hexadecimal of its absolute value, AABB, which is stored using 2 bytes. The offset of string "Scott" is 5 (0x05) whereas the one of string "Tiger" is 10 (i.e., 0x0A).

As illustrated, the second row 915 is identical to the first, except that except that column 4 (col4) is null. The serialization output is the same both the rows, save for the null value, which is shown to highlight the null indicator bitmap. In particular, as discussed above, the first row 910, the null bit is 0, e.g., the row does not have any null column. Therefore, the bitmap for null indicators is encoded (not needed) in the first row serialization output 920. In contrast, in the second row 915, the null bit is set to 1, and therefore the null-indicator bitmap is included in the second row serialization output 925. The null bitmap indicates that the third column is null (e.g., third column of the value part, fourth column of the full key and value).

Figure 10:
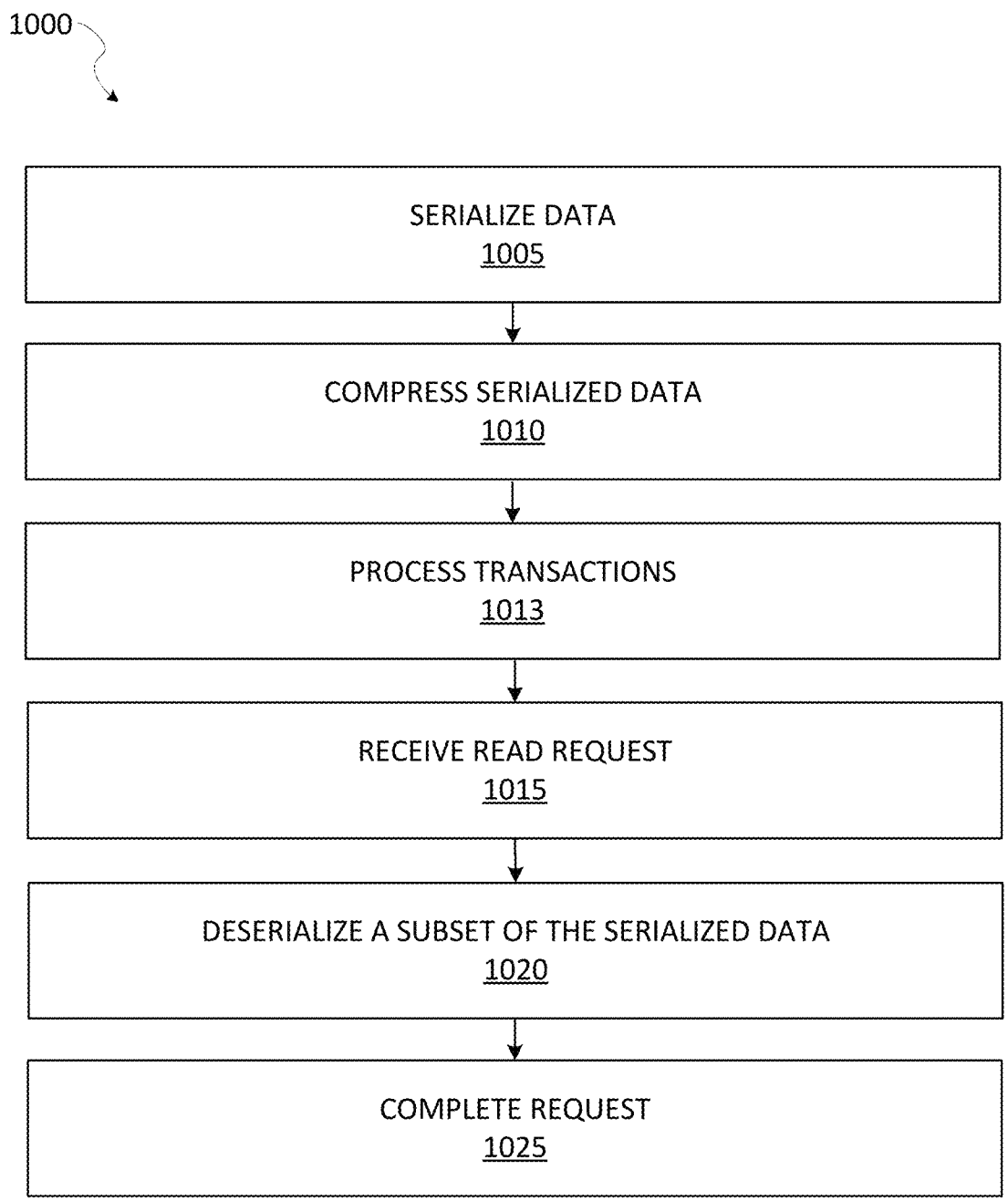
FIG. 10 shows a flow diagram for implementing serialization, in accordance with some embodiments of the present disclosure.

FIG. 10 shows a flow diagram of a method for implementing serialization in a hybrid database system, according to some example embodiments. At operation 1005, the hybrid database serializer system 230 serializes columnar data to generate serialized row data. At operation 1010, the hybrid database serializer system 230 compresses the serialized data (e.g., first row serialization output 920, second row serialization output 925) to generate compressed serialized data (e.g., compression via Snappy compression). In some example embodiments, the serialized value data is split into pieces and stored by the transaction manager 440 in the storage platform 104. At operation 1013, the transactional database system processes the data in the serialized format (e.g., via OLTP transactions). For example, the transaction manager 440 processes the jobs 410 in the row format data (e.g., KV pairs), which is stored in the storage platform 104, as shown in FIG. 4.

At operation 1015, the network based database system 102 receives a read request (e.g., from client device 114). For example, a OLAP query is received that references data that is in row format (e.g., KV pairs). At operation 1020, the hybrid database serializer system 230 identifies a subset of columns that are needed to complete the received query, and the subset of columns are deserialized and decompressed from row data format to the columnar format. In some example embodiments, the size map is implemented to identify and unpack the subset of columns of the query. In particular, and in accordance with some example embodiments, the size map stores the serialized byte sequence length of each column and from the size map, the hybrid database serializer system 230 calculates the individual starting position (e.g., offset) of each column in the value section of a key value pair. In some example embodiments, to identify the subset of columns, the hybrid database serializer system 230 jumps to their corresponding offsets and deserializes and decompresses the columns for the query, without processing unrelated columns, thereby saving computing resources. At operation 1025, the database system 102 completes the query (e.g., using the deserialized and decompressed subset of the data).

Figure 11:
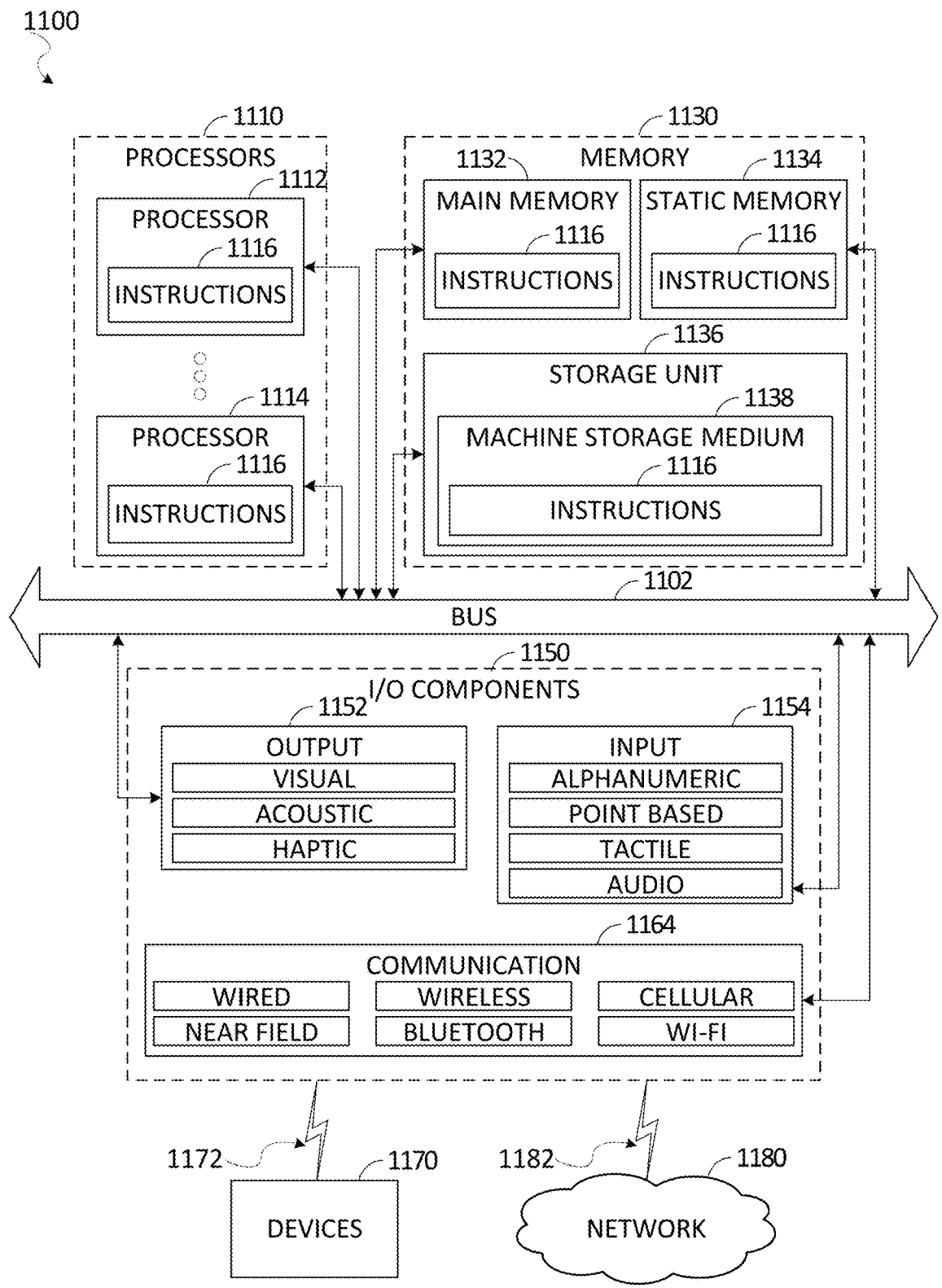
FIG. 11 illustrates a diagrammatic representation of a machine in the form of a computer system within which a set of instructions may be executed for causing the machine to perform any one or more of the methodologies discussed herein, in accordance with some embodiments of the present disclosure.

FIG. 11 illustrates a diagrammatic representation of a machine 1100 in the form of a computer system within which a set of instructions may be executed for causing the machine 1100 to perform any one or more of the methodologies discussed herein, according to an example embodiment. Specifically, FIG. 11 shows a diagrammatic representation of the machine 1100 in the example form of a computer system, within which instructions 1116 (e.g., software, a program, an application, an applet, an app, or other executable code) for causing the machine 1100 to perform any one or more of the methodologies discussed herein may be executed. For example, the instructions 1116 may cause the machine 1100 to execute any one or more operations of method 1000. As another example, the instructions 1116 may cause the machine 1100 to implement portions of the data flows illustrated in at least FIG. 4. In this way, the instructions 1116 transform a general, non-programmed machine into a particular machine 1100 (e.g., the compute service manager 108 or a node in the execution platform 110) that is specially configured to carry out any one of the described and illustrated functions in the manner described herein.

In alternative embodiments, the machine 1100 operates as a standalone device or may be coupled (e.g., networked) to other machines. In a networked deployment, the machine 1100 may operate in the capacity of a server machine or a client machine in a server-client network environment, or as a peer machine in a peer-to-peer (or distributed) network environment. The machine 1100 may comprise, but not be limited to, a server computer, a client computer, a personal computer (PC), a tablet computer, a laptop computer, a netbook, a smart phone, a mobile device, a network router, a network switch, a network bridge, or any machine capable of executing the instructions 1116, sequentially or otherwise, that specify actions to be taken by the machine 1100. Further, while only a single machine 1100 is illustrated, the term "machine" shall also be taken to include a collection of machines 1100 that individually or jointly execute the instructions 1116 to perform any one or more of the methodologies discussed herein.

The machine 1100 includes processors 1110, memory 1130, and input/output (I/O) components 1150 configured to communicate with each other such as via a bus 1102. In an example embodiment, the processors 1110 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 1112 and a processor 1114 that may execute the instructions 1116. The term "processor" is intended to include multi-core processors 1110 that may comprise two or more independent processors (sometimes referred to as "cores") that may execute instructions 1116 contemporaneously. Although FIG. 11 shows multiple processors 1110, the machine 1100 may include a single processor with a single core, a single processor with multiple cores (e.g., a multi-core processor), multiple processors with a single core, multiple processors with multiple cores, or any combination thereof.

The memory 1130 may include a main memory 1132, a static memory 1134, and a storage unit 1136, all accessible to the processors 1110 such as via the bus 1102. The main memory 1132, the static memory 1134, and the storage unit 1136 store the instructions 1116 embodying any one or more of the methodologies or functions described herein. The instructions 1116 may also reside, completely or partially, within the main memory 1132, within the static memory 1134, within machine storage medium 1138 of the storage unit 1136, within at least one of the processors 1110 (e.g., within the processor's cache memory), or any suitable combination thereof, during execution thereof by the machine 1100.

The I/O components 1150 include components to receive input, provide output, produce output, transmit information, exchange information, capture measurements, and so on. The specific I/O components 1150 that are included in a particular machine 1100 will depend on the type of machine. For example, portable machines such as mobile phones will likely include a touch input device or other such input mechanisms, while a headless server machine will likely not include such a touch input device. It will be appreciated that the I/O components 1150 may include many other components that are not shown in FIG. 11. The I/O components 1150 are grouped according to functionality merely for simplifying the following discussion and the grouping is in no way limiting. In various example embodiments, the I/O components 1150 may include output components 1152 and input components 1154. The output components 1152 may include visual components (e.g., a display such as a plasma display panel (PDP), a light emitting diode (LED) display, a liquid crystal display (LCD), a projector, or a cathode ray tube (CRT)), acoustic components (e.g., speakers), other signal generators, and so forth. The input components 1154 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

Communication may be implemented using a wide variety of technologies. The I/O components 1150 may include communication components 1164 operable to couple the machine 1100 to a network 1180 or devices 1170 via a coupling 1182 and a coupling 1172, respectively. For example, the communication components 1164 may include a network interface component or another suitable device to interface with the network 1180. In further examples, the communication components 1164 may include wired communication components, wireless communication components, cellular communication components, and other communication components to provide communication via other modalities. The devices 1170 may be another machine or any of a wide variety of peripheral devices (e.g., a peripheral device coupled via a universal serial bus (USB)). For example, as noted above, the machine 1100 may correspond to any one of the compute service manager 108 or the execution platform 110, and the devices 1170 may include the client device 114 or any other computing device described herein as being in communication with the network-based database system 102 or the cloud storage platform 104.

The various memories (e.g., 1130, 1132, 1134, and/or memory of the processor(s) 1110 and/or the storage unit 1136) may store one or more sets of instructions 1116 and data structures (e.g., software) embodying or utilized by any one or more of the methodologies or functions described herein. These instructions 1116, when executed by the processor(s) 1110, cause various operations to implement the disclosed embodiments.

As used herein, the terms "machine-storage medium," "device-storage medium," and "computer-storage medium" mean the same thing and may be used interchangeably in this disclosure. The terms refer to a single or multiple non-transitory storage devices and/or non-transitory media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 1180 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 1180 or a portion of the network 1180 may include a wireless or cellular network, and the coupling 1182 may be a Code Division Multiple Access (CDMA) connection, a Global System for Mobile communications (GSM) connection, or another type of cellular or wireless coupling. In this example, the coupling 1182 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 1116 may be transmitted or received over the network 1180 using a transmission medium via a network interface device (e.g., a network interface component included in the communication components 1164) and utilizing any one of a number of well-known transfer protocols (e.g., hypertext transfer protocol (HTTP)). Similarly, the instructions 1116 may be transmitted or received using a transmission medium via the coupling 1172 (e.g., a peer-to-peer coupling) to the devices 1170. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 1116 for execution by the machine 1100, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

The various operations of example methods described herein may be performed, at least partially, by one or more processors that are temporarily configured (e.g., by software) or permanently configured to perform the relevant operations. Similarly, the methods described herein may be at least partially processor-implemented. For example, at least some of the operations of the method 500 may be performed by one or more processors. The performance of certain of the operations may be distributed among the one or more processors, not only residing within a single machine, but also deployed across a number of machines. In some example embodiments, the processor or processors may be located in a single location (e.g., within a home environment, an office environment, or a server farm), while in other embodiments the processors may be distributed across a number of locations.

Although the embodiments of the present disclosure have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent, to those of skill in the art, upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

What is claimed is:

1. A method comprising:
   serializing, by at least one hardware processor, non-primary key data of column-organized data into compressed serialized value data that is in a row-organized sequence, the compressed serialized value data compressed using at least one bitmap, the non-primary key data comprising a schema identifier, the column-organized data being stored in a columnar database system, the column-organized data comprising primary key data and the non-primary key data;
   storing the compressed serialized value data in a key-value data store of a key-value database system, the key-value database system processing key-value data in a key-value format;
   receiving a query by the columnar database system;
   deserializing a portion of the compressed serialized value data that corresponds to the query; and
   processing the query using the columnar database system.

2. The method of claim 1, wherein the schema identifier comprises a variable length integer, the non-primary key data further comprises a compression bit, the compression bit indicates whether a portion of a row serialization output is not compressed, and the at least one bitmap is applied to generate bitmap compressed data.

3. The method of claim 1, wherein the at least one bitmap comprises an array of bits that can be set individually.

4. The method of claim 2, wherein the compressed serialized value data is generated by further compressing the bitmap compressed data using an additional compression scheme.

5. The method of claim 4, wherein the compressed serialized value data comprises metadata that indicates whether the additional compression scheme is applied to the compressed serialized value data.

6. The method of claim 1, wherein the portion of the compressed serialized value data that corresponds to the query is deserialized without deserializing remaining data in the compressed serialized value data that does not correspond to the query.

7. The method of claim 1, wherein the portion of data of the compressed serialized value data is deserialized using the at least one bitmap.

8. The method of claim 7, wherein deserializing the portion of data using the at least one bitmap decompresses the portion of data.

9. The method of claim 1, further comprising:
   identifying, in a hybrid database system, the column-organized data, the hybrid database system comprising a columnar database system that processes data in a columnar format and the key-value database system.

10. The method of claim 9, wherein the key-value database system comprises an online transactional processing (OLTP) database system and the columnar database system comprises an online analytical processing (OLAP) database system.

11. A system comprising:
a processor; and
a memory including instructions that, when executed by the processor, cause the processor to perform operations comprising:
serializing, by at least one hardware processor, non-primary key data of column-organized data into compressed serialized value data that is in a row-organized sequence, the compressed serialized value data compressed using at least one bitmap, the non-primary key data comprising a schema identifier, the column-organized data being stored in a columnar database system, the column-organized data comprising primary key data and the non-primary key data;
storing the compressed serialized value data in a key-value data store of a key-value database system, the key-value database system processing key-value data in a key-value format;
receiving a query by the columnar database system;
deserializing a portion of the compressed serialized value data that corresponds to the query; and
processing the query using the columnar database system.

12. The system of claim 11, wherein the schema identifier comprises a variable length integer, the non-primary key data further comprises a compression bit, the compression bit indicates whether a portion of a row serialization output is not compressed, and the at least one bitmap is applied to generate bitmap compressed data.

13. The system of claim 11, wherein the at least one bitmap comprises an array of bits that can be set individually.

14. The system of claim 12, wherein the compressed serialized value data is generated by further compressing the bitmap compressed data using an additional compression scheme.

15. The system of claim 14, wherein the compressed serialized value data comprises metadata that indicates whether the additional compression scheme is applied to the compressed serialized value data.

16. The system of claim 11, wherein the portion of the compressed serialized value data that corresponds to the query is deserialized without deserializing remaining data in the compressed serialized value data that does not correspond to the query.

17. The system of claim 11, wherein the portion of data of the compressed serialized value data is deserialized using the at least one bitmap.

18. The system of claim 17, wherein deserializing the portion of data using the at least one bitmap decompresses the portion of data.

19. The system of claim 11, wherein the operations further comprise:
identifying, in a hybrid database system, the column-organized data, the hybrid database system comprising a columnar database system that processes data in a columnar format and the key-value database system.

20. A non-transitory computer-readable medium comprising instructions, which when executed by a computing device, cause the computing device to perform operations comprising:
serializing, by at least one hardware processor, non-primary key data of column-organized data into compressed serialized value data that is in a row-organized sequence, the compressed serialized value data compressed using at least one bitmap, the non-primary key data comprising a schema identifier, the column-organized data being stored in a columnar database system, the column-organized data comprising primary key data and the non-primary key data;
storing the compressed serialized value data in a key-value data store of a key-value database system, the key-value database system processing key-value data in a key-value format;
receiving a query by the columnar database system;
deserializing a portion of the compressed serialized value data that corresponds to the query; and
processing the query using the columnar database system.

* * * * *